US009663153B2

United States Patent
Clark et al.

(10) Patent No.: US 9,663,153 B2
(45) Date of Patent: May 30, 2017

(54) FAIRING FOR VEHICLE LOAD BAR

(71) Applicant: Thule Sweden AB, Hillerstorp (SE)

(72) Inventors: Jason Clark, Prescott, AZ (US); Ian McLeran, Woodbury, CT (US)

(73) Assignee: Thule Sweden AB, Hillerstorp (SE)

( * ) Notice: Subject to any disclaimer, the term of this patent is extended or adjusted under 35 U.S.C. 154(b) by 33 days.

(21) Appl. No.: 14/811,384

(22) Filed: Jul. 28, 2015

(65) Prior Publication Data
US 2017/0029043 A1 Feb. 2, 2017

(51) Int. Cl.
*B60R 9/05* (2006.01)
*B60J 1/20* (2006.01)
*B62D 35/00* (2006.01)
*B60R 11/00* (2006.01)

(52) U.S. Cl.
CPC ........... *B62D 35/00* (2013.01); *B60R 9/05* (2013.01); *B60J 1/20* (2013.01); *B60R 2011/004* (2013.01); *B60R 2011/0052* (2013.01); *Y10T 403/32196* (2015.01)

(58) Field of Classification Search
CPC ........ B60R 9/05; B62D 35/00; B62D 35/005; B62D 35/007; B60J 1/2002; B60J 1/2005; B60J 1/2008; B60J 7/22; B60J 7/223; Y10T 403/32196
USPC ........................................................ 224/316
See application file for complete search history.

(56) References Cited

U.S. PATENT DOCUMENTS

| 1,588,202 | A | * | 6/1926 | Spencer | B60J 1/14 296/96.11 |
|---|---|---|---|---|---|
| 2,147,855 | A | * | 2/1939 | Normandin | B60J 1/14 296/96.11 |
| 3,089,728 | A | * | 5/1963 | Shumaker | B60J 1/20 296/91 |
| 3,647,257 | A | * | 3/1972 | Litchfield | B60J 1/20 296/146.8 |
| 3,815,696 | A | * | 6/1974 | Larive | B62M 27/02 180/190 |
| 3,857,149 | A | * | 12/1974 | Hassan | B23P 11/00 29/898.043 |
| 4,033,245 | A | * | 7/1977 | DeRees | B60J 1/20 296/91 |
| 4,085,665 | A | * | 4/1978 | Paxton | B60J 1/20 296/91 |
| 4,170,377 | A | * | 10/1979 | Ingram | B60J 1/2008 105/1.3 |
| 4,179,154 | A | * | 12/1979 | Ingram | B60J 1/2008 296/91 |
| 4,293,159 | A | * | 10/1981 | Bott | B62D 35/00 105/1.1 |
| 4,406,491 | A | * | 9/1983 | Forster | B62D 35/001 224/316 |
| 4,674,788 | A | * | 6/1987 | Ohmura | B62D 35/007 296/180.5 |

(Continued)

*Primary Examiner* — Justin Larson
(74) *Attorney, Agent, or Firm* — Sterne, Kessler, Goldstein & Fox P.L.L.C.

(57) ABSTRACT

A fairing for a vehicle load bar includes an elongate blade and a connection assembly to couple the blade to the load bar. The connection assembly includes a joint having a ball disposed in a socket such that the ball can rotate within the socket. The connection assembly can include a pivot bracket coupled to the blade, the pivot bracket including the ball, and a pivot arm including the socket such that the ball of the pivot bracket is disposed in the socket.

22 Claims, 20 Drawing Sheets

(56) References Cited

U.S. PATENT DOCUMENTS

| | | | | |
|---|---|---|---|---|
| 4,700,919 A | * | 10/1987 | Saunders, IV | B60J 1/005 248/288.31 |
| 4,701,990 A | * | 10/1987 | Kehl | F16C 11/069 29/441.2 |
| 4,881,484 A | * | 11/1989 | Cavanaugh | B60J 7/223 114/361 |
| 5,096,106 A | * | 3/1992 | Foster | B60R 9/045 16/349 |
| D345,956 S | * | 4/1994 | Turner | D12/181 |
| 5,382,070 A | * | 1/1995 | Turner | B62D 35/007 296/180.1 |
| 6,425,507 B1 | * | 7/2002 | Allen | B60R 9/05 224/309 |
| 7,347,485 B1 | * | 3/2008 | Saunders | B60J 1/20 296/180.5 |
| 7,854,467 B2 | * | 12/2010 | McKnight | F15D 1/10 296/180.1 |
| 8,226,152 B2 | * | 7/2012 | Calco | B60J 1/20 296/152 |

* cited by examiner

FAIRING FOR VEHICLE LOAD BAR

BACKGROUND

Field

Embodiments of the present invention relate to fairings for load bars of vehicles. More specifically, embodiments of the present invention relate to fairings with a connection assembly having a ball and socket joint for connecting the fairing blade to the load bar.

Background

Load bars are useful for mounting equipment onto a vehicle. However, load bars can reduce the aerodynamic profile of a vehicle, causing drag. A fairing attached to the load bar can deflect wind over the load bar, thereby making a smoother air path and improving the aerodynamics.

BRIEF SUMMARY

In certain embodiments, a fairing for a vehicle load bar includes an elongate blade and a connection assembly to couple the blade to the load bar. In certain embodiments, the connection assembly can include a joint having a ball disposed in a socket such that the ball can rotate within the socket. In certain embodiments, the connection assembly can have a pivot bracket coupled to the blade. In certain embodiments, the pivot bracket can include the ball. In certain embodiments, the connection assembly can have a pivot arm that includes the socket where the ball of the pivot bracket can be disposed.

In certain embodiments, the pivot arm can include a first arm having a first socket and a second arm having a second socket. In certain embodiments, the second arm can be connected to the first arm by an elbow portion. In certain embodiments, the first arm, the second arm, and the elbow portion can be integrally formed.

In certain embodiments, the pivot bracket can include a head portion that can be coupled to the blade and a tail portion extending from the head portion. In certain embodiments, the ball can be disposed at an end of the tail portion. In certain embodiments, the head portion can include a first plate and a second plate. In certain embodiments, an upper edge of the blade can be disposed in a slot between the first plate and the second plate.

In certain embodiments, the ball can include a ridge defining a first hemisphere and a second hemisphere of the ball. In certain embodiments, a portion of the first hemisphere can be disposed in the first socket and a portion of the second hemisphere can be disposed in the second socket. The ridge can be configured to limit a range of motion of the ball with the first and second sockets.

In certain embodiments, the connection assembly can include a load bar clip. In certain embodiments, the load bar clip can include a load bar attachment portion and a pivot arm attachment portion. In certain embodiments, the pivot arm attachment portion of the load bar clip can include a first extension, a second extension generally parallel to the first extension, and a rod connecting the first extension and the second extension. In certain embodiments, when a fastener of the pivot arm is unfastened, an elbow portion of the pivot arm can rotate about the rod of the pivot arm attachment portion. In certain embodiments, when the fastener is fastened, the elbow portion of the pivot arm can be fixed about the rod of the pivot arm attachment portion while the ball is free to rotate in the socket. In certain embodiments, the load bar attachment portion can include a hook having an interior surface configured to contact a lower surface and trailing edge of a load bar. In certain embodiments, the load bar attachment portion can include at least one prong configured to engage a groove in an upper surface of the load bar.

In certain embodiments, the fairing can include a foot disposed at a lower edge of the blade to engage the roof of a vehicle. In certain embodiments, the foot can include a heel, a first leg, a second leg spaced from the first leg, a bar connecting the first leg and the second leg, a convex lower surface, and a pad disposed on the convex lower surface. In certain embodiments, a notch in the lower edge of the blade can be configured to couple to the bar to secure the foot to the blade.

In certain embodiments, a system for attaching a fairing to a load bar can include a pivot bracket, a pivot arm, and a load bar clip. In certain embodiments, the pivot bracket can include a head portion having a first plate and a second plate spaced from the first plate, and a tail portion having a ball. In certain embodiments, the pivot arm can include a first arm having a first socket and a second arm having a second socket. In certain embodiments, the second arm can be integrally connected to the first arm by an elbow portion. In certain embodiments, the ball of the pivot bracket can be disposed in the first socket and the second socket and rotate in the first and second sockets. In certain embodiments, the load bar clip can include a load bar attachment portion and a pivot arm attachment portion having a rod. In certain embodiments, the elbow portion of the pivot arm can be selectively rotatable about the rod.

In certain embodiments, the ball can include a ridge defining a first hemisphere and a second hemisphere. In certain embodiments, a portion of the first hemisphere can be disposed in the first socket and a portion of the second hemisphere can be disposed in the second socket. In certain embodiments, the ridge can limit a range of motion of the ball within the first and second sockets.

In certain embodiments, the load bar attachment portion can include a hook having an interior surface configured to follow a contour of a lower surface and a trailing edge of the load bar. In certain embodiments, the load bar attachment portion can include at least one prong that curves around a leading edge of the load bar and engages a groove in an upper surface of the load bar.

In certain embodiments, a bar adapter can be disposed within the load bar attachment portion of the load bar clip. In certain embodiments, the bar adapter can include a cutout sized to surround and contact an exterior surface of the load bar. In certain embodiments, the bar adapter can include a latch disposed between the prong and the hook configured to secure the bar adapter about the load bar.

In certain embodiments, a fairing for a vehicle load bar can include an elongate blade, an end cap, and a first pivot arm. In certain embodiments, the end cap can include a front face, a rear face, and an attachment element extending from the rear face of the end cap. In certain embodiments, the attachment element can include a first ball. In certain embodiments, the first pivot arm can include a first arm having a first socket and a second arm having a second socket. In certain embodiments, the second arm can be connected to the first arm by a first elbow portion. In certain embodiments, the first ball can be disposed in the first socket and the second socket.

In certain embodiments, the fairing can also include a pivot bracket and a second pivot arm. In certain embodiments, the pivot bracket can include a head portion coupled to the blade and a tail portion having a second ball. In certain embodiments, the second pivot arm can include a third arm having a third socket and a fourth arm having a fourth socket. In certain embodiments, the third arm can be connected to the fourth arm by a second elbow portion. In certain embodiments, the second ball can be disposed in the third socket and the fourth socket.

BRIEF DESCRIPTION OF THE DRAWINGS

The accompanying drawing with are incorporated herein and form part of the specification, illustrate the embodiments and, together with the description, further serve to explain the principles of the embodiments and to enable a person skilled in the relevant art(s) to make and use the embodiments.

Figure 1:
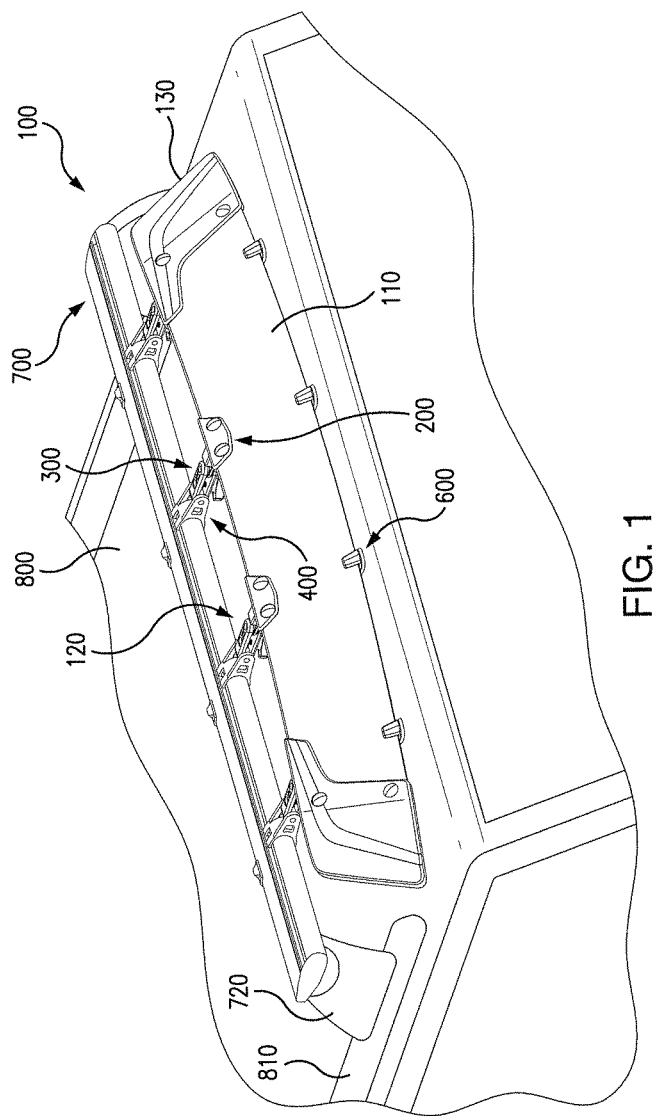
FIG. 1 illustrates a front perspective view of a fairing attached to a load bar on a vehicle roof according to an embodiment.

The features and advantages of the embodiments will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

The present invention will now be described in detail with reference to embodiments thereof as illustrated in the accompanying drawings. References to "one embodiment," "an embodiment," "some embodiments," "certain embodiments," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "invention" or "present invention" as used herein is a non-limiting term and is not intended to refer to any single embodiment of the particular invention but encompasses all possible embodiments as described in the application.

In general, fairings are designed to improve the aerodynamics of a vehicle, especially at high speeds. In order to achieve maximum aerodynamic benefit, it is important that the fairing contact the roof of the vehicle as closely as possible along a bottom edge of the fairing blade. This can be difficult given the curved nature of some roofs. The fairings disclosed herein have a pivotable connection assembly to better fit the various curvatures of different vehicle roofs, thereby reducing drag and improving the aerodynamics. In particular, the fairings described herein improve the aerodynamics and acoustics of a vehicle having one or more load bars mounted on a roof. Because vehicle roofs have different shapes, sizes, and curvatures, it can be difficult to fit a single fairing to various roofs and still achieve the maximum aerodynamic benefit in each case. An important part of efficient aerodynamic performance of fairings is to have the bottom edge of the fairing blade fit closely to the roof.

Features of the fairings disclosed herein may improve the fit between the fairing blade and the roof of the vehicle. For example, the connection assemblies disclosed herein allow the blade to curve and flex along its length to conform to the curvature of the roof. Having multiple connection assemblies along the length of the blade can allow different portions of the blade to flex more or less independently, as necessary, to fit a particular roof In certain embodiments, the connection assembly can have a ball and socket joint between the blade and the load bar. Such a joint can allow the fairing blade to pivot or rotate in multiple directions while fitting it to the roof. In certain embodiments, a foot or feet attached to a lower edge of the fairing blade can be curved to allow the fairing blade to rock on the surface of the roof, reducing vibrations and noise. A foot can also be attached to the fairing blade at a keyhole notch in the lower surface of the fairing blade, allowing the fairing blade to rotate with respect to the foot, which can also reduce vibration and noise.

Not only do the fairings improve the aerodynamics, but the better fit to the roof decreases the vibration on the roof, making for a quieter ride in an interior of the vehicle cabin. These and other features of the fairings disclosed herein are described in detail below with respect to the Figures.

FIG. 1 illustrates fairing 100 mounted on a roof 800 of a vehicle, according to an embodiment. Fairing 100 can be mounted to roof 800 via a load bar 700. Load bar 700 can be attached to a rail 810 of a roof rack on the vehicle using a mounting foot 720. In other embodiments, load bar 700 can be attached to the vehicle via a channel disposed in or mounted to the vehicle roof, a fixpoint, or in another suitable manner. Fairing blade 110 can be coupled to load bar 700 by one or more connection assembly 120. In certain embodiments, connection assembly 120 can include pivot bracket 200, pivot arm 300, and load bar clip 400. In certain embodiments, blade 110 can have an end cap 130 disposed at either or both ends of blade 110. End cap 130 can also be designed to reduce drag near edges of fairing blade 110. In certain embodiments, end caps 130 can be part of connection assembly 120. In certain embodiments, one or more foot 600 can be disposed along a lower edge of fairing blade 110 between fairing blade 110 and roof 800 to minimize vibration and scratching.

Figure 2:
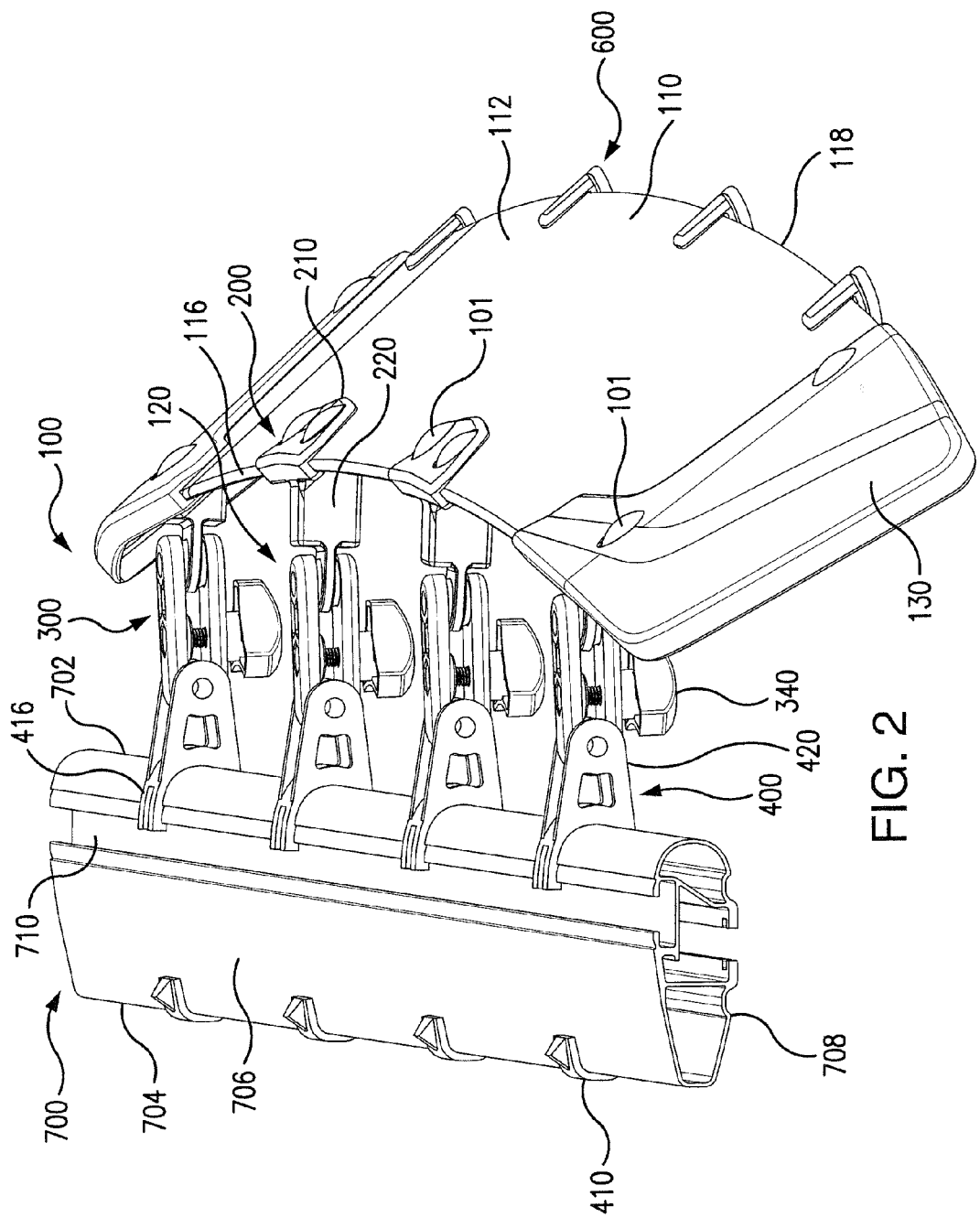
FIG. 2 illustrates a side perspective view of a fairing attached to a load bar according to an embodiment.

FIG. 2 illustrates fairing 100 attached to load bar 700, according to an embodiment. As shown in FIG. 2, in certain embodiments, blade 110 can have one or more feet 600 disposed along lower edge 118 of blade 110. In certain embodiments, blade 110 can be made of flexible plastic. This can allow blade 110 to flex or bow along its length to fit the curvature of a roof. In certain embodiments, blade 110 can be bowed when attached to load bar 700 and disposed on the roof of a vehicle. Each end of blade 110 can have an end cap 130. In certain embodiments, end cap 130 can be attached to blade 110 by one or more fasteners 101. As referred to herein, the term "fastener" includes, but is not limited to, bolts, screws, rivets, clips, adhesives, etc. that are configured to secure elements together. In certain embodiments, end cap 130 can be made of plastic.

In certain embodiments, one or more pivot brackets 200 can be coupled to upper edge 116 of blade 110. In certain embodiments, two pivot brackets 200 can be coupled to blade 110. For example, two pivot brackets 200 can be spaced evenly on either side of a midpoint along upper edge 116 of blade 110. Fewer or more pivot brackets can also be used. For example, a single pivot bracket 200 can be disposed at a midpoint of upper edge 116 in certain embodiments. Three, four, or five pivot brackets can also be spaced evenly or unevenly along blade 110. The pivot brackets 200 can have the same or different lengths.

In certain embodiments, head portion 210 of pivot bracket 200 can be attached to blade 110 by one or more fasteners 101. In certain embodiments, tail portion 220 of pivot bracket 200 can extend from head portion 210 and couple with pivot arm 300, which is described in more detail below. In certain embodiments, fastener 340 can tighten pivot arm 300 to couple pivot arm 300 with tail portion 220 of pivot bracket 200.

In certain embodiments, an opposite end of pivot arm 300 can couple with load bar clip 400. In certain embodiments, load bar clip 400 can have a pivot arm attachment portion 420 that couples with pivot arm 300. In certain embodiments, load bar clip 400 can have a load bar attachment portion 410 that couples load bar clip 400, and thus connection assembly 120, to load bar 700. In certain embodiments, prongs 416 of load bar clip 400 can couple into a groove 710 in an upper surface 706 of load bar 700. In certain embodiments, a hook 412 of load bar clip 400 can extend under a lower surface 708 and around a trailing edge 704 of load bar 700 to couple load bar clip 400 to load bar 700.

Figure 3:
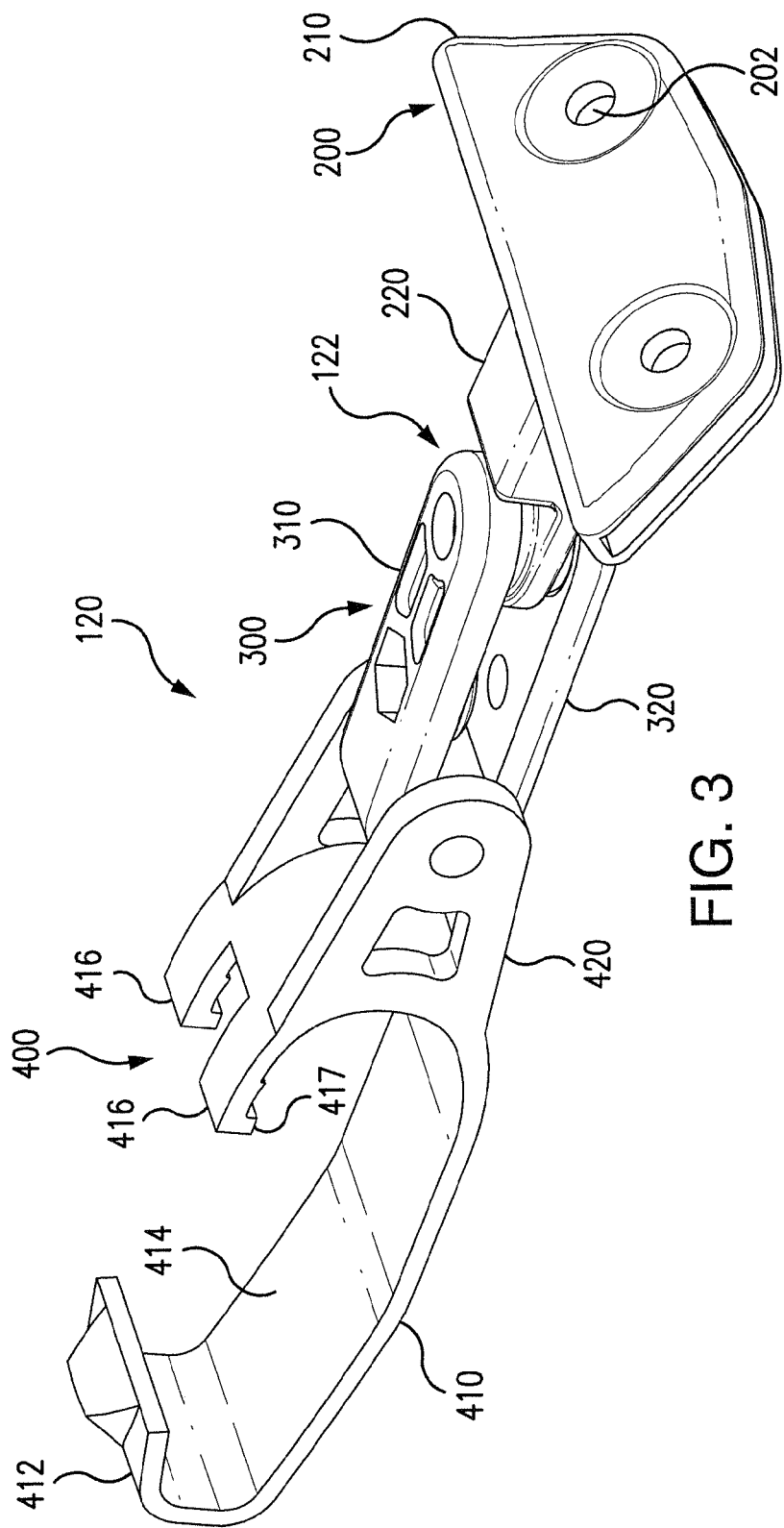
FIG. 3 illustrates a perspective view of a connection assembly of a fairing according to an embodiment.

FIG. 3 illustrates connection assembly 120, according to an embodiment. FIG. 3 illustrates the general features of connection assembly 120. More specific details are described with respect to the Figures for each element. In certain embodiments, connection assembly 120 can include pivot bracket 200, pivot arm 300, and load bar clip 400. The elements of connection assembly 120 can be made of various materials, including, but not limited to plastic, metal, rubber, etc. In certain embodiments, each component of connection assembly 120 can be formed from a single piece of material, for example, by injection molding.

Connection assembly 120 can couple blade 110 to load bar 700 in a manner that improves the fit of fairing 100 onto the vehicle. For example, the components of connection assembly 120 can tilt, rotate, pivot, and/or lock with respect to each other. This can allow the blade 110 to fit better on the roof. For example, this can allow the bottom edge of blade 110 to fit more closely to the contour of the roof surface along a portion or the entire length of the blade 110. When more than one connection assembly 120 is used to couple fairing blade 110 to load bar 700, each connection assembly 120 can separately adjust to customize the fit of fairing blade 110 to the roof. For example, each connection assembly 120 can be attached to a load bar 700 and then pushed into contact with the roof, allowing the elements of the connection assembly 120 to rotate and move as necessary for the best fit. A fastener of connection assembly 120 can then be tightened to lock the connection assembly 120 in place. This process can be repeated for each connection assembly 120 along the fairing to improve the fit. In certain embodiments, the elements of connection assembly 120, and thus the connection assembly itself, can be different lengths. This can allow the fairing blade 110 to bow, if necessary, along the vehicle roof.

As shown in FIG. 3, in certain embodiments, pivot bracket 200 includes head portion 210 and tail portion 220. One or more through holes 202 can extend through head portion 210 of pivot bracket 200. Fasteners 101 can extend through these through holes 202 in order to couple head portion 210 with fairing blade 110.

In certain embodiments, connection assembly 120 includes a joint 122. Joint 122 is an important feature because it allows connection assembly 120 to move, rotate, and pivot to facilitate fitting of fairing blade 110 to the contour of the vehicle roof surface and/or the load bar 700. In certain embodiments, joint 122 comprises a ball and socket joint permitting rotation of tail portion 220 within pivot arm 300. A ball and socket joint can allow for rotational movement in multiple directions. Other types of joints permitting desired adjustment can also be used, including, for example, a hinge joint. However, a ball and socket joint can allow for more degrees of freedom, and therefore a more customized fit of fairing blade 110 to the vehicle roof.

In certain embodiments, tail portion 220 of pivot bracket 200 can be coupled with pivot arm 300 at joint 122. In certain embodiments, joint 122 comprises a ball and socket joint permitting rotation of tail portion 220 within pivot arm 300. More specifically, in certain embodiments, pivot arm 300 can include a first arm 310 and a second arm 320. Tail portion 220 of pivot bracket 200 can be disposed between first arm 310 and second arm 320 to form joint 122. In certain embodiments, elbow portion 330 can connect first arm 310 and second arm 320.

Figure 19:
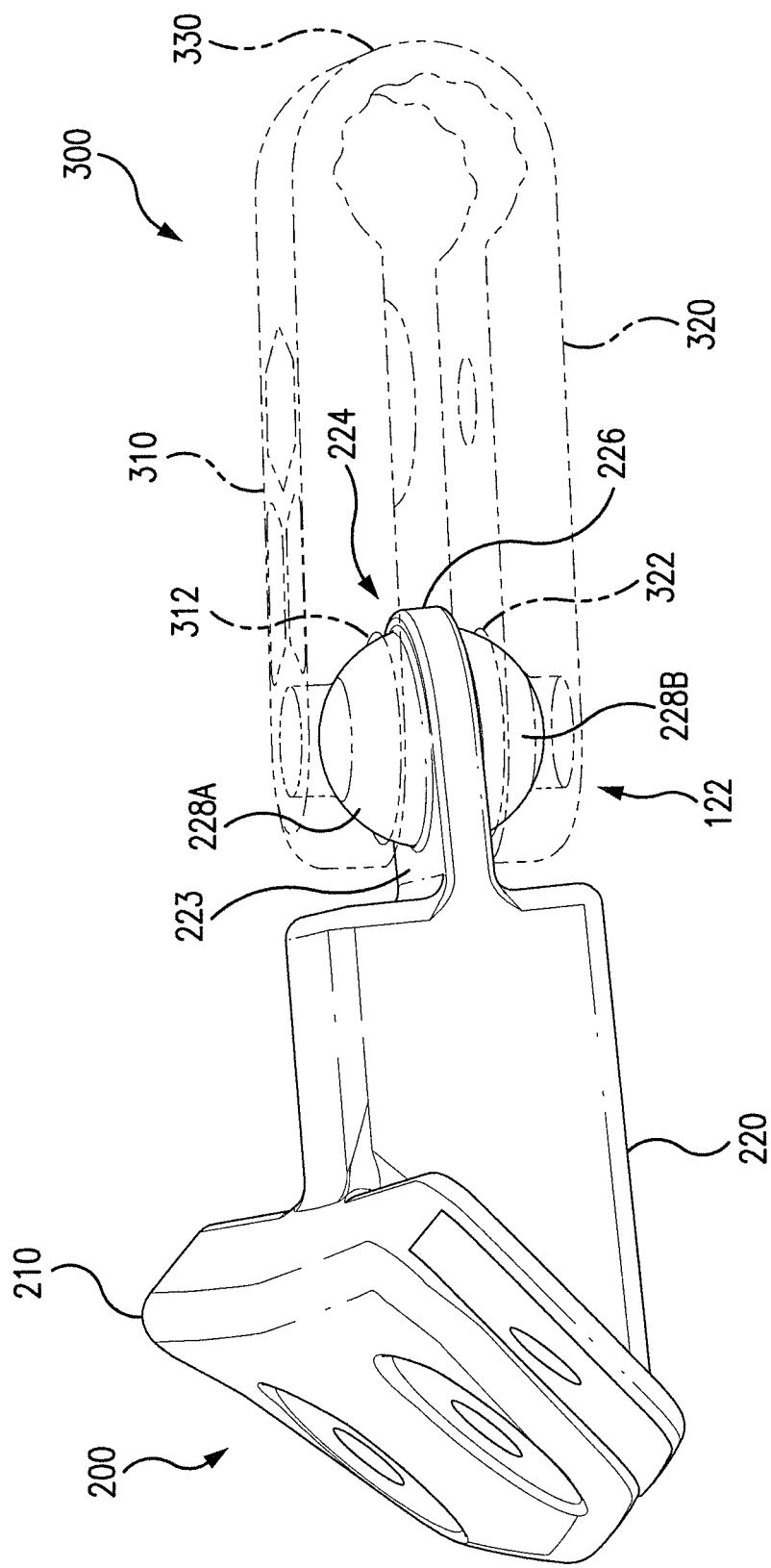
FIG. 19 illustrates a joint of a connection assembly according to an embodiment.

FIG. 19 illustrates pivot bracket 200 connected to pivot arm 300, according to an embodiment. Pivot arm 300 is shown in phantom view so that the connection between pivot bracket 200 and pivot arm 300 at joint 122 can be seen. In certain embodiments, arms 310, 320 of pivot arm 300 can each have a socket 312, 322, respectively. The sockets 312, 322 can be configured to receive a ball 224, which in certain embodiments can extend from a flange 223 of tail portion 220 of pivot bracket 200. In certain embodiments, ball 224 can have a ridge 226 defining a first hemisphere 228A and a second hemisphere 228B. Each of these elements is described in further detail below. Although the embodiments shown in the Figures include ball 224 as part of pivot bracket 200, in other embodiments, ball 224 can be part of another component of connection assembly 120, for example, pivot arm 300, and pivot bracket 200 can include sockets.

Referring back to FIG. 3, in certain embodiments, pivot arm 300 can be coupled to load bar clip 400. For example, pivot arm 300 can be coupled with pivot arm attachment portion 420 of load bar clip 400. In certain embodiments, load bar clip 400 can include load bar attachment portion 410. Load bar attachment portion 410 can include a hook 412 having an interior surface 414 configured to contact a lower surface 708 of load bar 700. Hook 412 can extend around a trailing edge 704 of a load bar 700 to couple load bar clip 400 to load bar 700. In certain embodiments, load bar clip 400 can also include prongs 416 to couple load bar clip 400 to load bar 700. In certain embodiments, prongs 416 can have one or more teeth 417 extending therefrom to further facilitate coupling prongs 416 into a groove 710 along load bar 700 (see FIG. 2).

Figure 4:
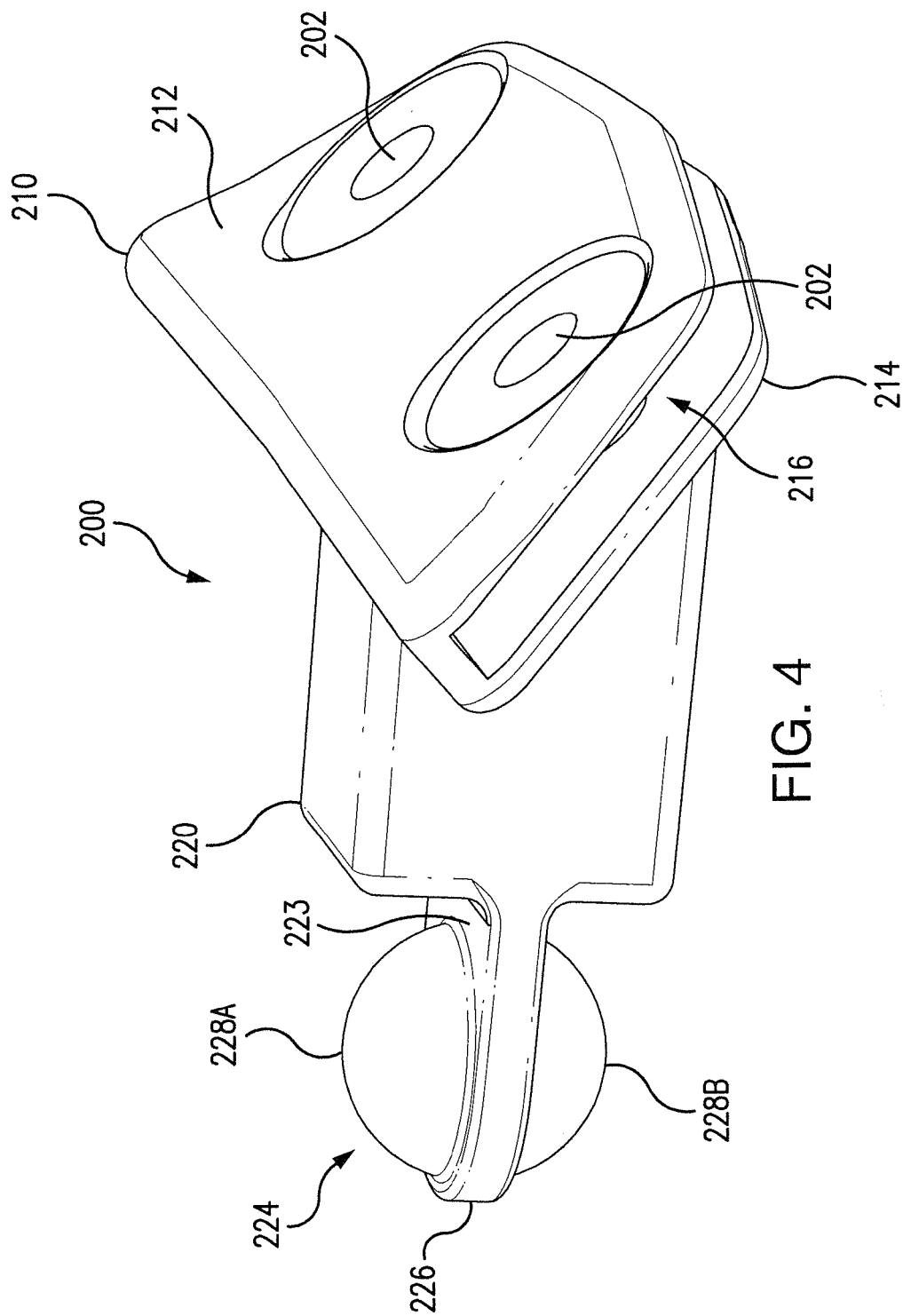
FIG. 4 illustrates a perspective view of a pivot bracket according to an embodiment.
Figure 5:
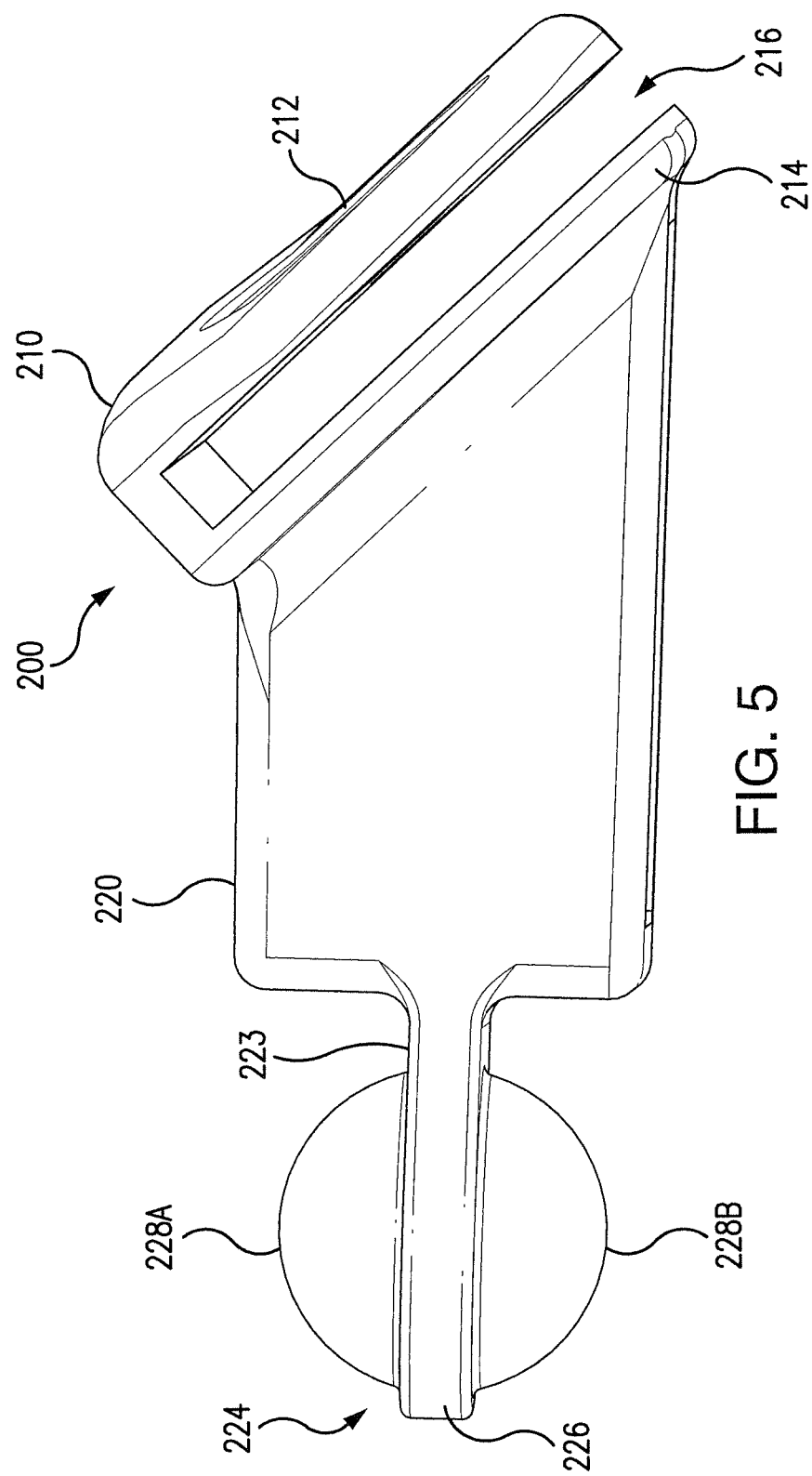
FIG. 5 illustrates a side view of a pivot bracket according to an embodiment.
Figure 6:
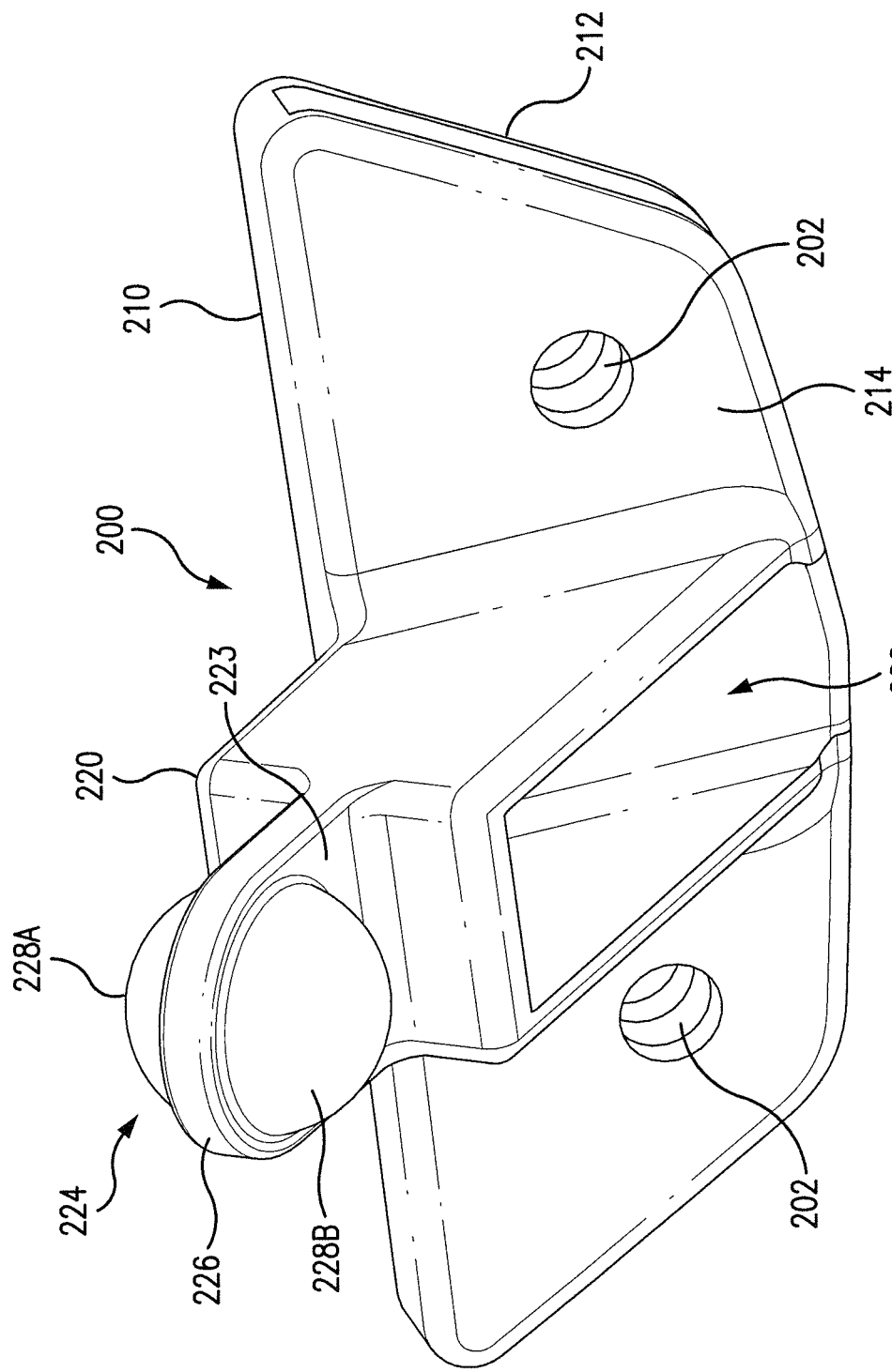
FIG. 6 illustrates a rear perspective view of a pivot bracket according to an embodiment.

FIGS. 4-6 illustrate pivot bracket 200 according to an embodiment. FIG. 4 illustrates a perspective view of pivot bracket 200. Head portion 210 of pivot bracket 200 can be configured to couple pivot bracket 200 with fairing blade 110. In certain embodiments, head portion 210 can include first plate 212 and second plate 214, forming a slot 216 therebetween. In certain embodiments, fairing blade 110 can be disposed within slot 216 between first plate 212 and second plate 214. In certain embodiments, one or more through holes 202 can extend through first plate 212 and second plate 214 of head portion 210. Through holes 202 can facilitate coupling head portion 210 to fairing blade 110 by having fasteners 101 extending therethrough. Other ways of coupling pivot bracket 200 with fairing blade 110 are also contemplated, for example, by friction fit or using adhesive. In certain embodiments, pivot bracket 200 can be integrally formed with fairing blade 110. In certain embodiments, a single plate can form head portion 210 of pivot bracket 200 and attach to front surface 112 or rear surface 114 of fairing blade 110.

In certain embodiments, pivot bracket 200 can include tail portion 220, which can extend from head portion 210. In certain embodiments, tail portion 220 can include ball 224. In certain embodiments, ball 224 can be disposed at an end of tail portion 220. In certain embodiments, a flange 223 can couple ball 224 with tail portion 220. Ball 224 can be the ball portion of a ball and socket joint, for example, joint 122 of connection assembly 120. In certain embodiments, ball 224 can be spherical in shape to facilitate movement of ball 224 in all directions within joint 122.

In certain embodiments, for example, as shown in FIG. 4, a ridge 226 can extend around ball 224. In certain embodiments, ridge 226 can extend entirely around ball 224, defining a first hemisphere 228A and a second hemisphere 228B of ball 224. As such, in certain embodiments, ridge 226 can extend about an equator of ball 224. In certain embodiments, ridge 226 can be disposed around ball 224 such that hemispheres 228A, 228B are asymmetrical. In certain embodiments, ridge 226 can extend only around a portion of ball 224. In certain embodiments, ball 224 can have more than one ridge.

Ridge 226 can be configured to limit movement of ball 224 within joint 122 by preventing entirely free rotation of ball 224 within joint 122. For example, a spherical ball would be able to rotate 360 degrees in certain directions. However, ridge 226 can act as a mechanical stop that engages, for example, arms 310, 320 of pivot arm 300 to limit the movement of ball 224 within joint 122. Other surface irregularities, for example protrusions, on ball 224 can have a similar effect as ridge 226.

FIG. 5 illustrates a side view of pivot bracket 200, according to an embodiment. As shown in FIG. 5, in certain embodiments, slot 216 can extend entirely through head portion 210, defining a space or slot 216 between first plate 212 and second plate 214 of head portion 210. Slot 216 can be sized to frictionally fit fairing blade 110 between the plates 212, 214. In certain embodiments, first plate 212 and second plate 214 can be generally parallel to each other. Plates 212, 214 can be disposed at various angles with respect to tail portion 220 so that an angle of fairing blade 110 achieves the best aerodynamic properties when on the roof of a vehicle. As shown in FIG. 5, in certain embodiments, flange 223 can be part of ridge 226.

FIG. 6 shows a rear perspective view of pivot bracket 200. As shown in FIG. 6, in certain embodiments, holes 202 can extend entirely through first plate 212 and second plate 214 of head portion 210. In certain embodiments, tail portion 220 can have a cutout 222 such that tail portion 220 has a hollow interior space. This can reduce the weight of pivot bracket 200. In certain embodiments, tail portion 220 can be solid for increased strength of pivot bracket 200.

Figure 7:
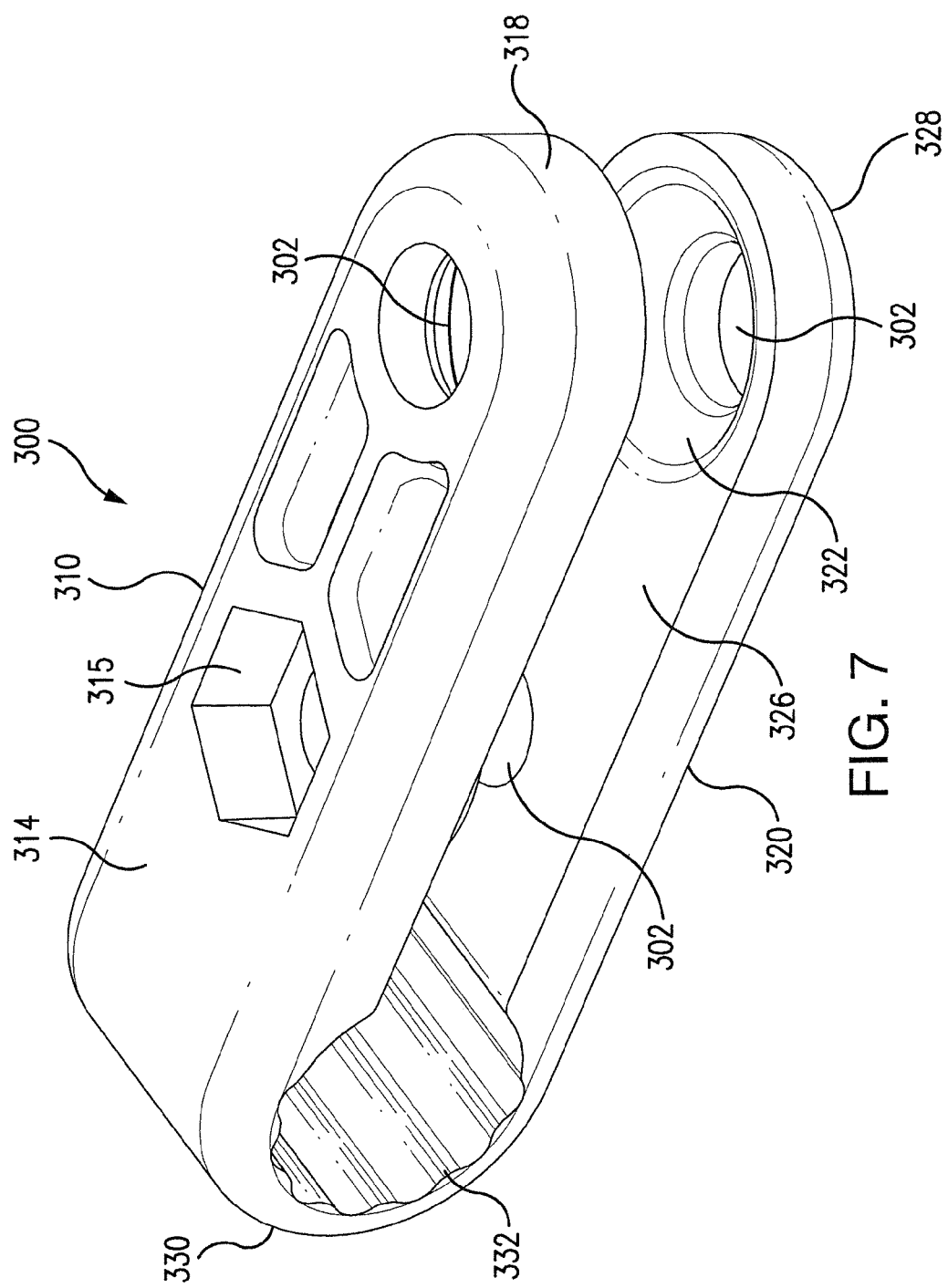
FIG. 7 illustrates a perspective view of a pivot arm according to an embodiment.
Figure 8:
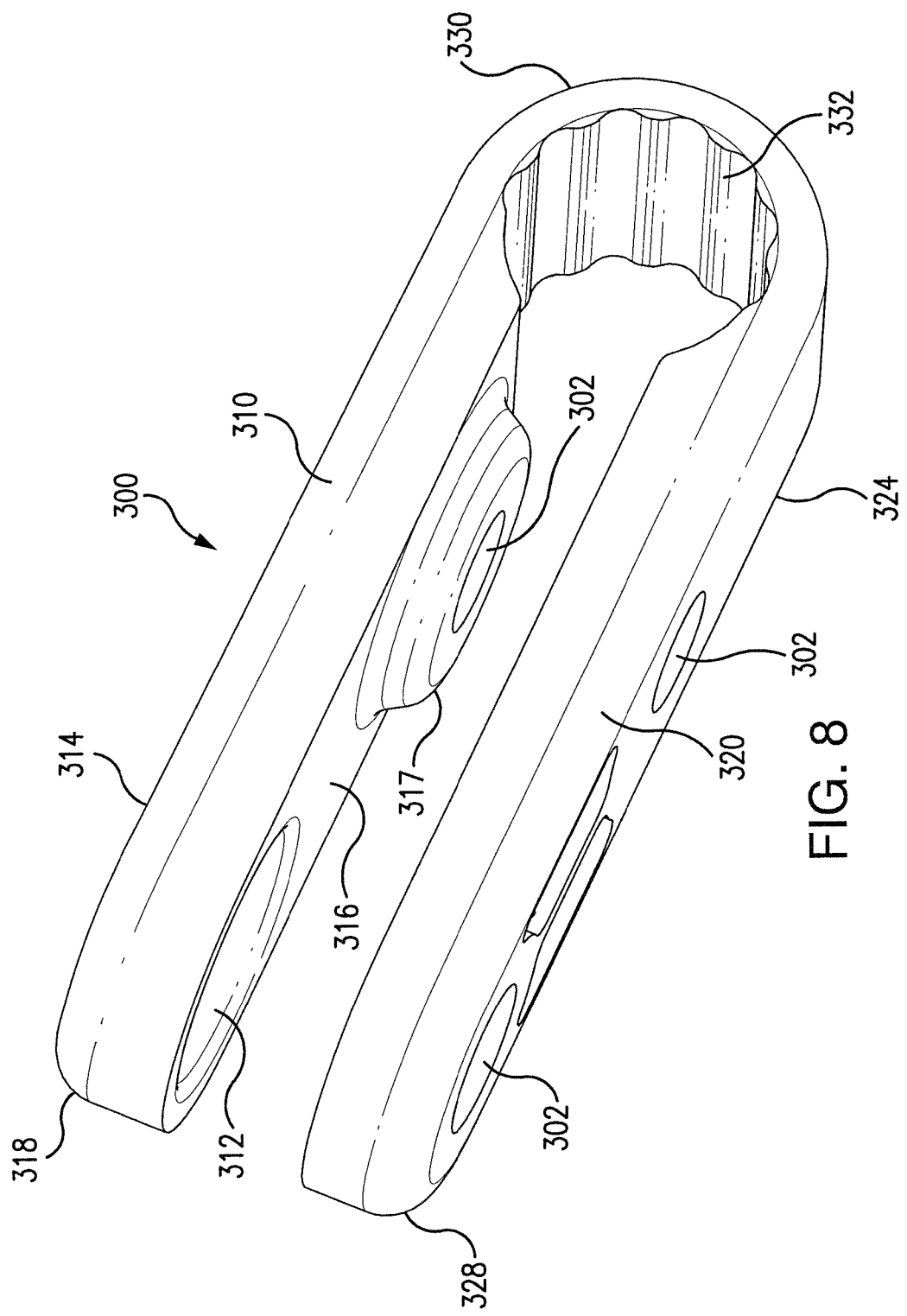
FIG. 8 illustrates a side perspective view of a pivot arm according to an embodiment.
Figure 9:
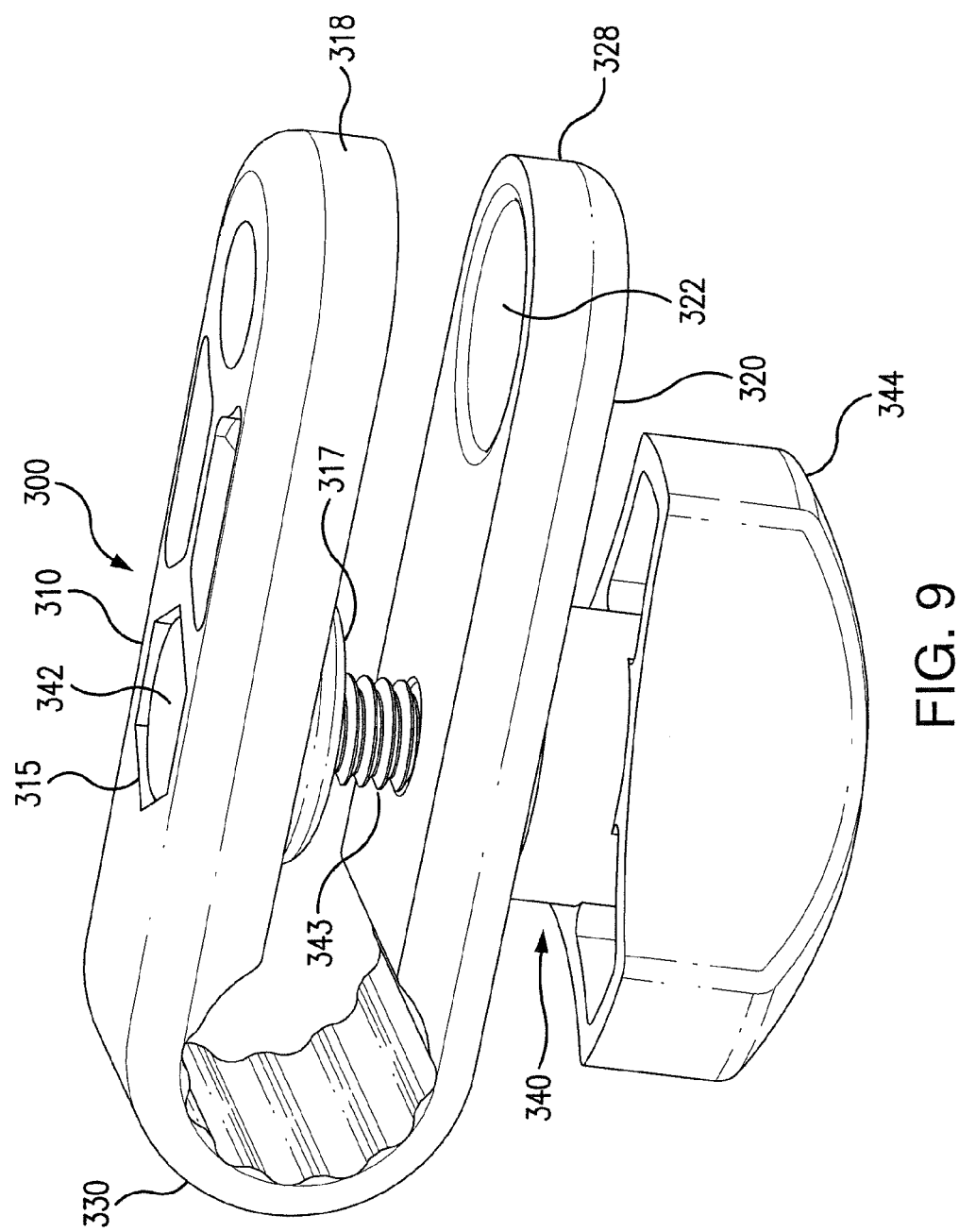
FIG. 9 illustrates a perspective view of a pivot arm with a fastener according to an embodiment.

FIGS. 7-9 illustrate pivot arm 300, according to an embodiment. In certain embodiments, pivot arm 300 can include first arm 310 and second arm 320. In certain embodiments, first arm 310 and second arm 320 can be coupled by elbow portion 330. In certain embodiments, first arm 310, second arm 320, and elbow portion 330 can be integrally formed from the same material. It is understood that features of pivot arm 300 described with respect to first arm 310 can similarly be included instead or in addition as part of second arm 320, and vice versa.

As shown in FIGS. 7 and 8, in certain embodiments, first arm 310 can include a first socket 312, which can be disposed near end 318 of first arm 310. Similarly, second arm 320 can include second socket 322 near end 328 of second arm 320. In certain embodiments, first socket 312 and/or second socket 322 can be formed as a depression in the respective arm 310, 320. That is, first socket 312 and second socket 322 can be a concavity in an interior surface 316, 326 of first arm 310 and second arm 320, respectively. The shape and size of sockets 312, 322 can correspond to the exterior surface of ball 224. Thus, the sockets 312, 322 can allow ball 224 of pivot bracket 200 to rotate within the sockets. This facilitates adjustment of pivot bracket 200 with respect to pivot arm 300 in multiple directions.

In certain embodiments, holes 302 can extend through first arm 310 and second arm 320 at the sockets 312, 322. This can decrease the amount of surface area that creates friction on ball 224. In certain embodiments, a hole 302 can extend through first min 310 and second arm 320 at a location between ends 318 and 328, respectively, and elbow portion 330. As shown in FIG. 9, in certain embodiments, a fastener 340 can extend through holes 302. In certain embodiments, a cavity 315 in exterior surface 314 of first arm 310 can be configured to fit a screw 342. Screw 342 can have exterior threading 343 which can mate with interior threading on a head 344 of fastener 340. Other types of fasteners can be used that apply force to move the arms together. When fastener 340 is tightened, pivot arm 300 can be clamped about load bar clip 400 and pivot bracket 200. In certain embodiments, ball 224 of pivot bracket 200 can still rotate within sockets 312, 322 of pivot arm 300 even when fastener 340 is tightened. This can be achieved by locating holes 302 closer to elbow portion 330 than the ends 318, 328 of the arms 310, 320. As such, when fastener 340 is tightened, more force is applied near elbow portion 330 than at the free ends 318, 328 of arms 310, 320.

As shown in FIG. 8, in certain embodiments, a protrusion 317 can extend from an interior surface 316 of first arm 310. Protrusion 317 can be opposite cavity 315 in exterior surface 314 of first arm 310. Protrusion 317 can increase stability and strength of first arm 310 in the area where cavity 315 removes material from first arm 310. In certain embodiments, elbow portion 330 of pivot arm 300 can include one or more grooves 332. Grooves 332 can facilitate gripping a rod 426 of pivot arm attachment portion 420 of load bar clip 400, as discussed in more detail below.

Figure 10:
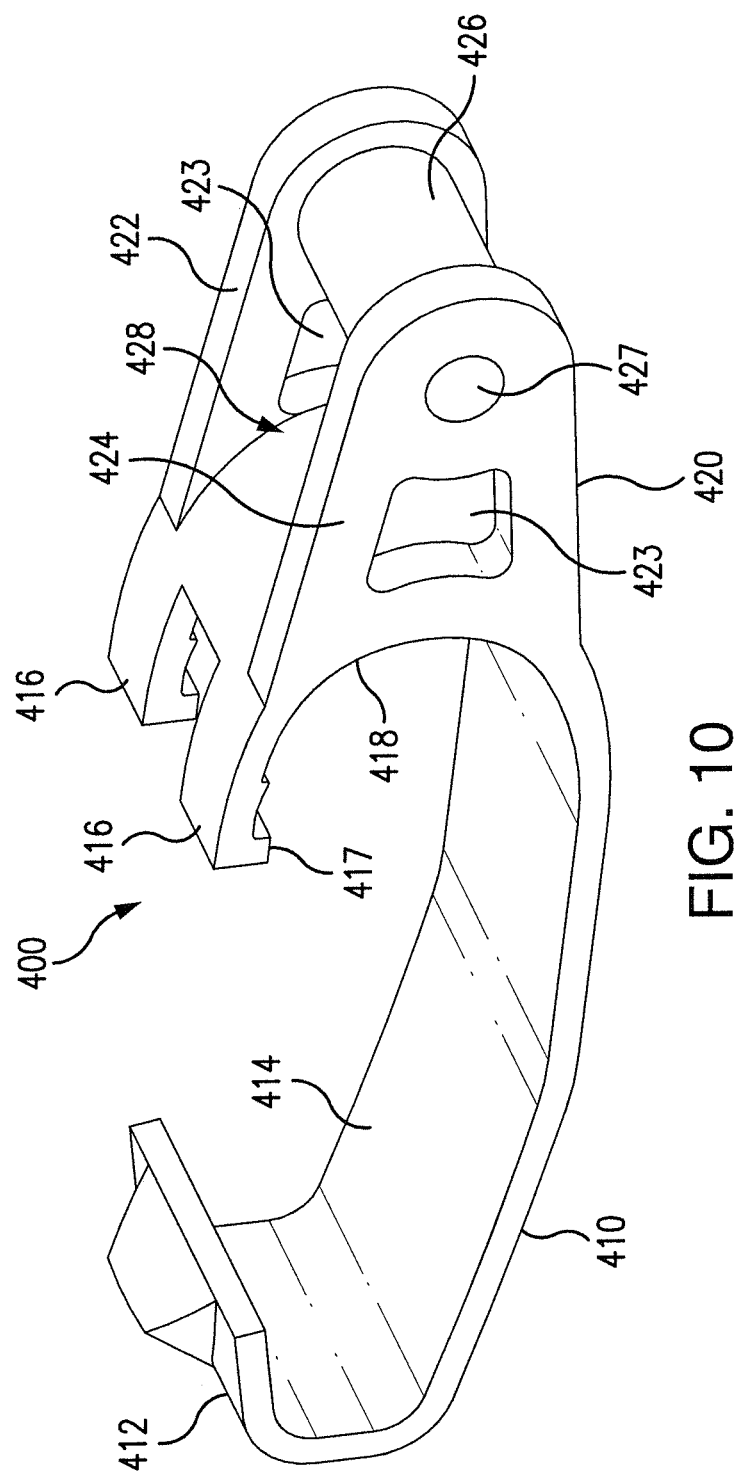
FIG. 10 illustrates a perspective view of a load bar clip according to an embodiment.

FIG. 10 illustrates load bar clip 400, according to an embodiment. In certain embodiments, load bar clip 400 can include pivot arm attachment portion 420, which can facilitate coupling load bar clip 400 with pivot arm 300. In certain embodiments, pivot arm attachment portion 420 can include a first extension 422 and a second extension 424. In certain embodiments, first extension 422 and second extension 424 can be spaced from each other and connected by a rod 426. In certain embodiments, in order to couple pivot arm 300 with load bar clip 400, the first arm 310 and second arm 320 can be spread apart and placed on either side of rod 426 so that rod 426 is between first arm 310 and second arm 320. Rod 426 can fit within elbow portion 330 of pivot arm 300. As such, elbow portion 330 of pivot arm 300 can be rotatably disposed about rod 426 when connection assembly 120 is assembled. In certain embodiments, first extension 422 and second extension 424 can have one or more cutouts 423. In certain embodiments, hole 427 can extend through rod 426. Cutouts 423 and hole 427 can decrease the weight of load bar clip 400. In certain embodiments, there can be a space 428 between proximal ends of the extensions 422, 424 and rod 426. Generally, space 428 can be large enough so that second arm 320 or first arm 310 of pivot arm 300 can fit between rod 426 and the proximal ends of extensions 422, 424 where they extend from load bar clip 400. This allows pivot arm 300 to couple with load bar clip 400.

In certain embodiments, load bar clip 400 can include load bar attachment portion 410. In certain embodiments, load bar attachment portion can include hook 412 having an interior surface 414. Interior surface 414 can be configured to follow a contour of a lower surface 708 of a specific load bar 700. In certain embodiments, hook 412 can extend around a trailing edge 704 of load bar 700 to hook load bar clip 400 onto the load bar 700. In certain embodiments, load bar clip 400 can include one or more prongs 416 which can extend around a leading edge 702 and upper surface 706 of load bar 700. In certain embodiments, prongs 416 can include one or more teeth 417, which can hook into a groove 710 in load bar 700, to secure load bar clip 400 onto load bar 700. In certain embodiments, hook 412 can follow a contour of an upper surface of load bar 700 and prongs 416 can extend below a lower surface of load bar 700.

Figure 11:
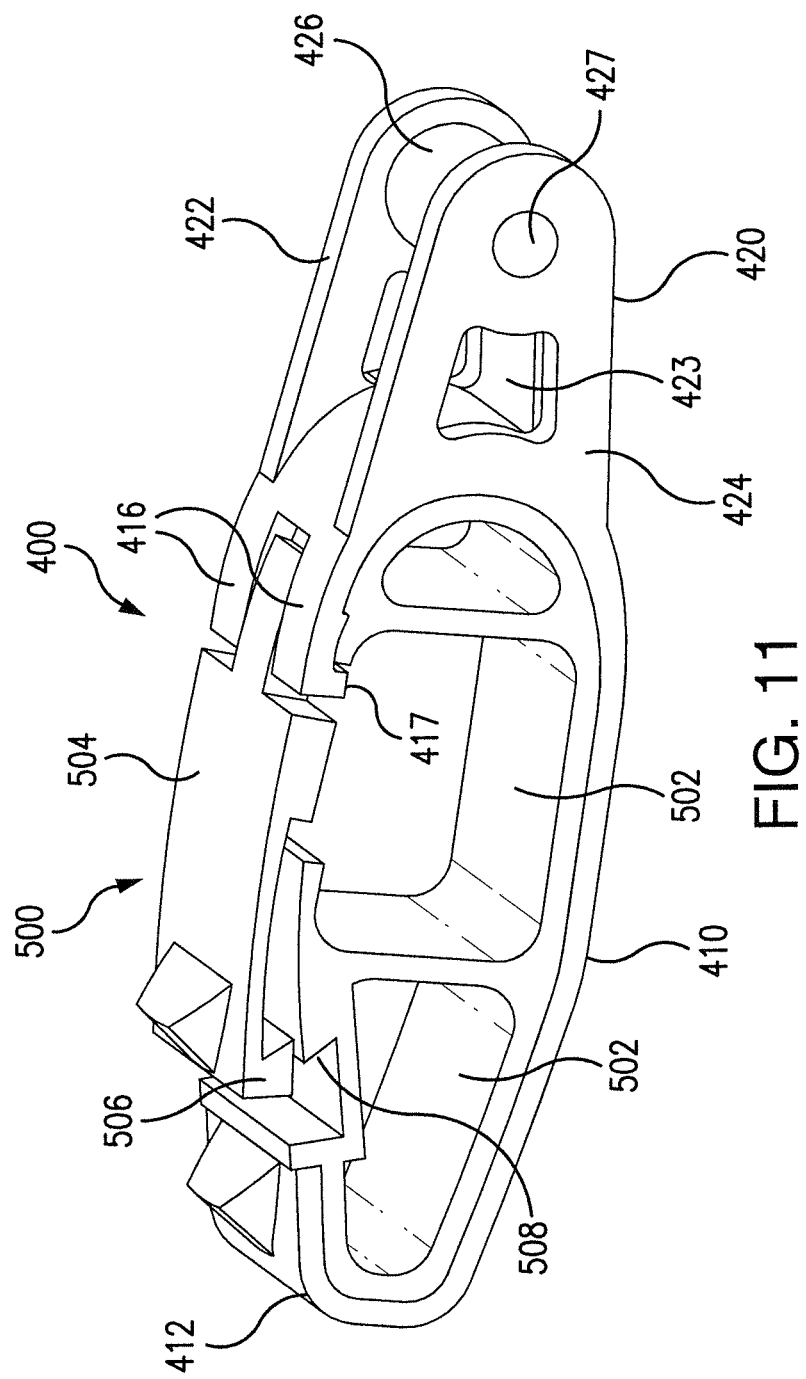
FIG. 11 illustrates a perspective view of a load bar clip having a bar adapter according to an embodiment.
Figure 12:
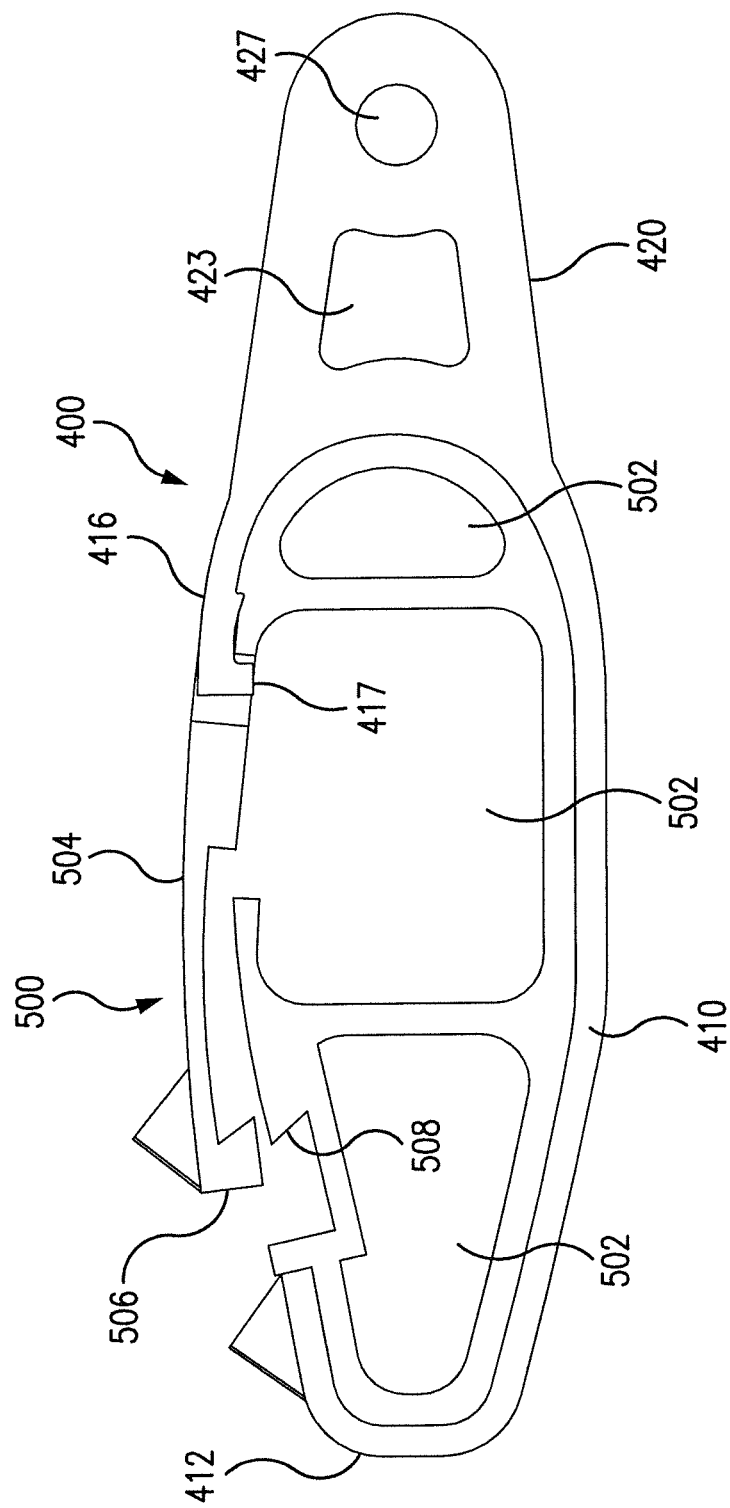
FIG. 12 illustrates a side view of the load bar clip and bar adapter shown in FIG. 11.

FIGS. 11 and 12 illustrate load bar clip 400 with a bar adapter 500 disposed within load bar attachment portion 410, according to an embodiment. Bar adapter 500 can allow load bar clip 400 to be used with various types of load bars without entirely different load bar clips. In certain embodiments, bar adapter 500 can be configured to fit tightly within hook 412 of load bar attachment portion 410. Bar adapter 500 can have one or more cutout 502 extending through bar adapter 500. Generally, a cutout 502 in bar adapter 500 is sized and shaped to fit tightly about a particular load bar. For example, bar adapter 500 can have a cutout 502 sized and shaped to fit around a square load bar.

In certain embodiments, bar adapter 500 can include a latch 504 to secure bar adapter 500 within load bar clip 400 and about the load bar. In certain embodiments, latch 504 can include a tongue 506 and a groove 508. It is contemplated that other attachment mechanisms, for example but not limited to a snap fit connection, can be used for latch 504. In certain embodiments, bar adapter 500 can be a single solid piece of material having one cutout 502 for a load bar, where the piece of material is sized to fit tightly within load bar attachment portion 410 of load bar clip 400.

Figure 20:
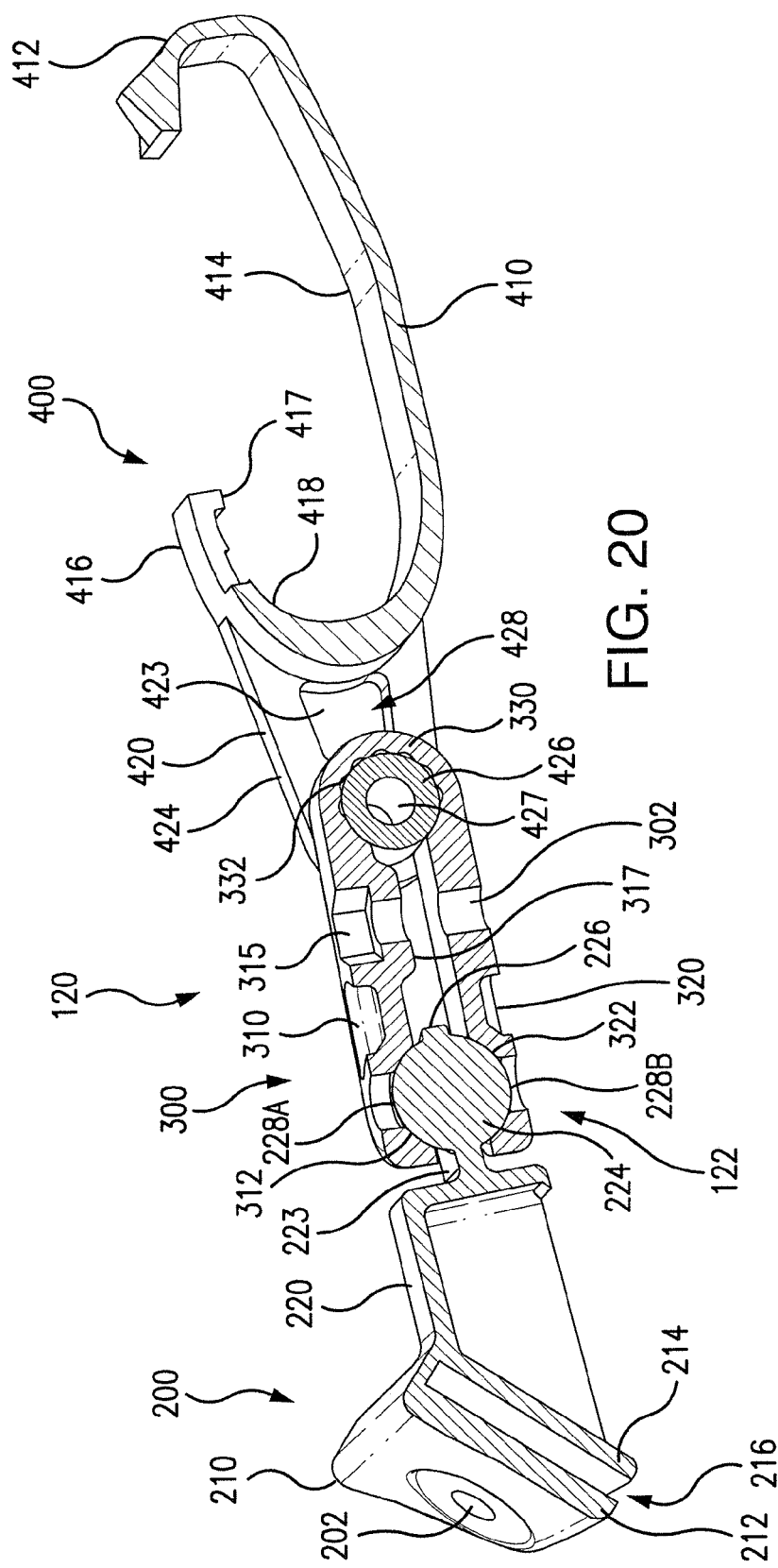
FIG. 20 illustrates a cross-section of a connection assembly according to an embodiment.

FIG. 20 illustrates a cross-sectional view of connection assembly 120, according to an embodiment. FIG. 20 illustrates connections between pivot bracket 200, pivot arm 300, and load bar clip 400. In certain embodiments, pivot bracket 200 can include head portion 210 having first plate 212 and second plate 214 forming slot 216 therebetween. One or more holes 202 can extend through first plate 212 and second plate 214 so that pivot bracket 200 can be coupled fairing blade 110. In certain embodiments, tail portion 220 can extend from head portion 210. Tail portion 220 can have ball 224 disposed at an end. In certain embodiments, a flange 223 can couple ball 224 to tail portion 220. In certain embodiments, ball 224 can have ridge 226 defining first and second hemispheres 228A and 228B.

Ball 224 of pivot bracket 200 can be coupled with pivot arm 300 at joint 122 in the manner of a ball and socket joint. Pivot arm 300 can include first arm 310 and second arm 320. Each arm can have a socket 312, 322 configured to receive ball 224 so that ball 224 can rotate in multiple directions within the sockets 312, 322. First arm 310 and second arm 320 can be coupled by elbow portion 330. In certain embodiments, first arm 310 can include cavity 315 and second arm 320 can include hole 302 for receiving part of a fastener, for example, a bolt. In certain embodiments, protrusion 317 can extend from an interior surface of first arm 310, opposite cavity 315.

Load bar clip 400 can include a pivot arm attachment portion 420. In certain embodiments, elbow portion 330 of pivot arm 300 can be rotatably coupled about rod 426 of pivot arm attachment portion 410. In certain embodiments, rod 426 can be disposed at an end of second extension 424 of pivot arm attachment portion 410. Second extension 424 can have a cutout 423. As shown in FIG. 20, there can be a space 428 between elbow portion 330 of pivot arm 300 and a proximal end of pivot arm attachment portion 420. This space can allow arms 310, 320 to be spread and placed around rod 426 to couple pivot arm 300 with load bar clip 400.

In certain embodiments, load bar clip an also include load bar attachment portion 410. Hook 412 of load bar attachment portion 410 can have an interior surface configured to be disposed along a bottom of a load bar and around a trailing edge of the load bar. At an opposite end, load bar attachment portion 410 can have one or more prongs 416 having an interior surface 418 configured to contact a leading edge of a load bar. One or more teeth 417 can extend from prongs 416 to couple with a groove in the upper surface of the load bar.

Figure 13:
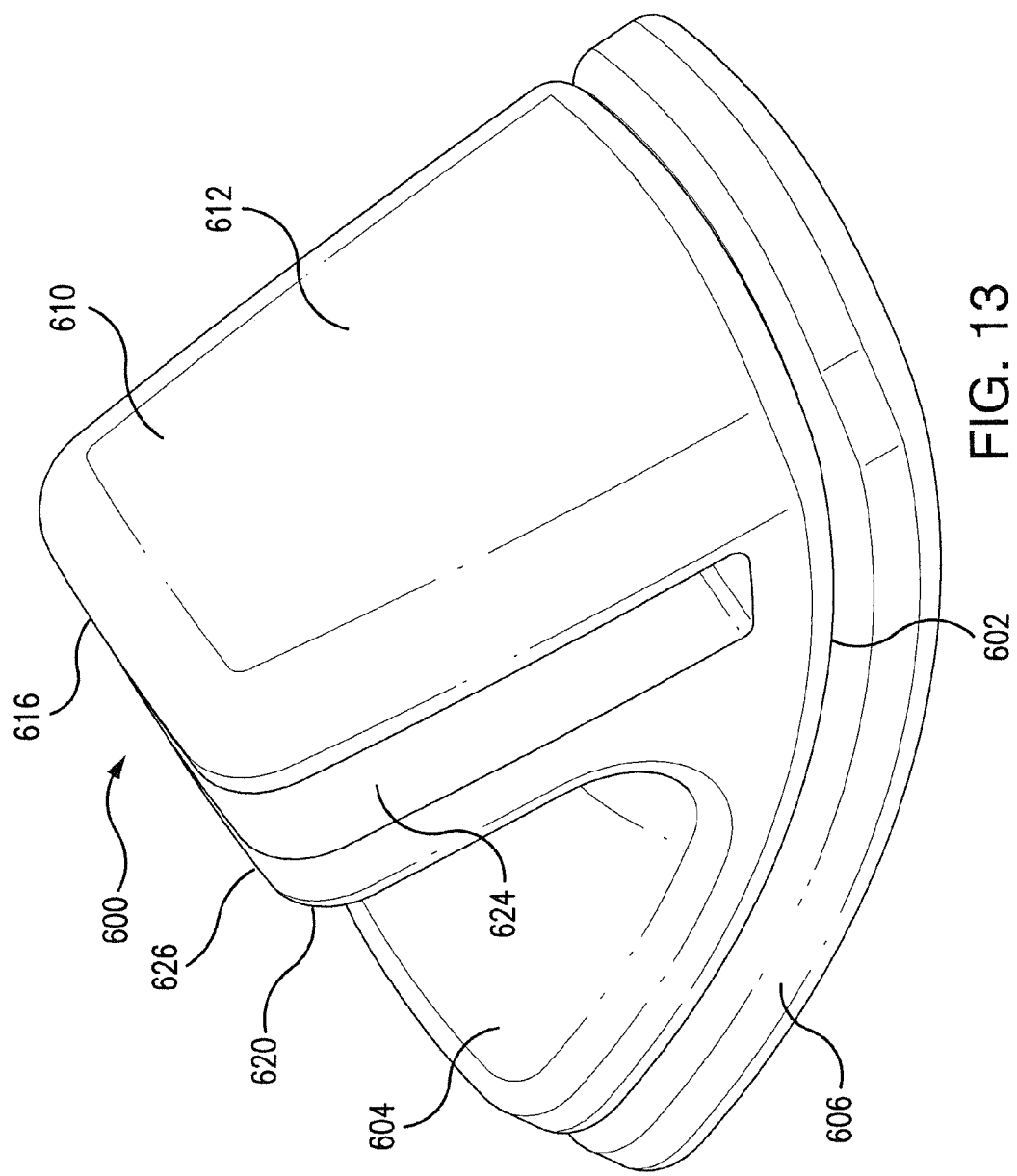
FIG. 13 illustrates a perspective view of a foot for a fairing according to an embodiment.
Figure 14:
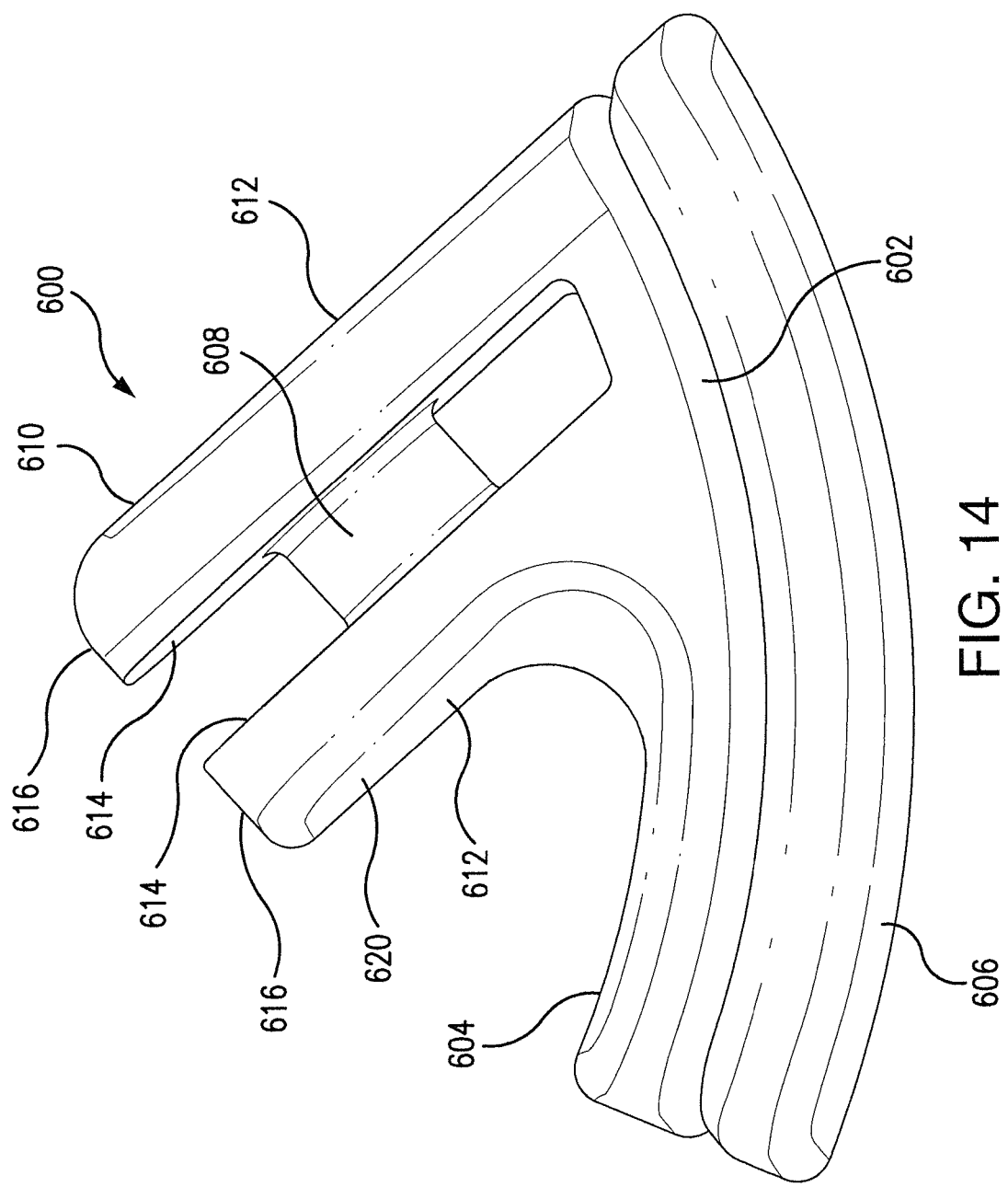
FIG. 14 illustrates a side view of a foot according to an embodiment.

FIGS. 13 and 14 illustrate foot 600, according to an embodiment. One or more feet 600 can be disposed along a lower edge 118 of fairing blade 110. For example, 1, 2, 3, 4, 5, 6, 7, or more feet can be used. In certain embodiments, four feet 600 can be disposed along the lower edge 118 of fairing blade 110. In certain embodiments, three feet 600 can be disposed along the lower edge 118 of fairing blade 110.

Foot 600 can facilitate engagement of fairing blade 110 with roof 800 of a vehicle and also prevent blade 110 from scratching roof 800. For example, in certain embodiments, foot 600 can have a lower surface 602 on which a pad 606 can be disposed. Pad 606 can be made from a cushioning material, for example, but not limited to foam, rubber, polymers, etc. In certain embodiments, lower surface 602 and pad 606 can be convex. This can allow foot 600 to rock along roof 800 of the vehicle and therefore provide consistent engagement between foot 600 and roof 800 while also reducing noise produced from vibration of fairing 100 on roof 800.

In certain embodiments, foot 600 can include first leg 610, second leg 620, and heel 604. In certain embodiments, first leg 610 can have an exterior surface 612, an interior surface 614, and an end 616. Second leg 620 can also have an exterior surface 622, an interior surface 624, and an end 626. In certain embodiments, bar 608 can be disposed between first leg 610 and second leg 620 to connect first leg 610 and second leg 620, while at the same time providing a space between first leg 610 and second leg 620. In certain embodiments, bar 608 of foot 600 can be configured to mate with a notch 119 in the lower edge 118 of fairing blade 110. Notch 119 to rotate about bar 608, which can improve the fit of fairing blade 110 along roof 800.

Figure 15:
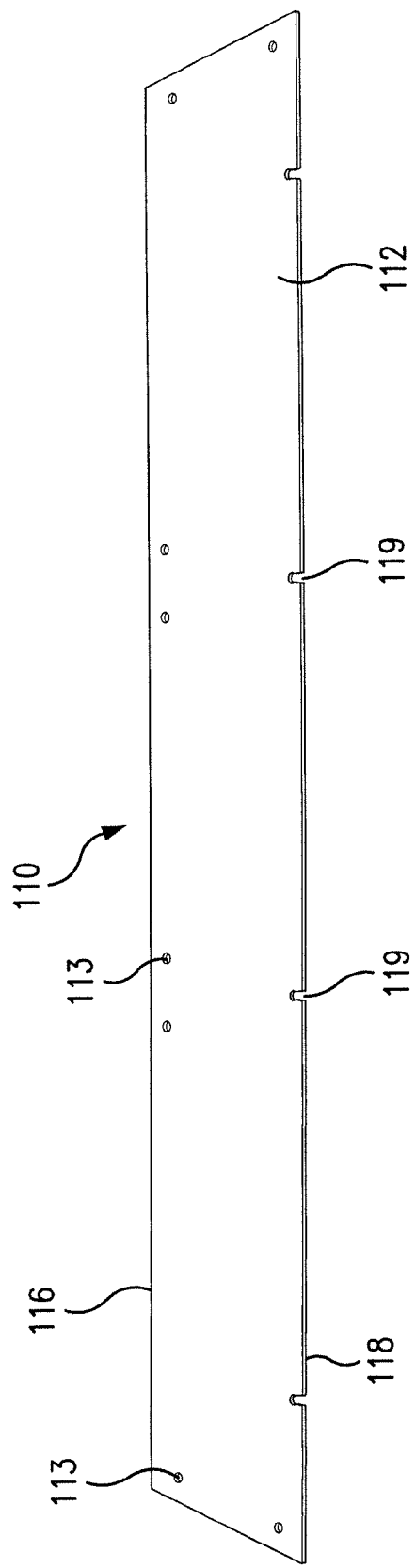
FIG. 15 illustrates a front perspective view of a fairing blade according to an embodiment.

FIG. 15 illustrates a front perspective view of fairing blade 110, according to an embodiment. As previously discussed, in certain embodiments, fairing blade 110 can include front surface 112, upper edge 116, and lower edge 118. In certain embodiments, holes 113 can extend through fairing blade 110 at various locations. Holes 113 can facilitate the attachment of various components of fairing 100 to fairing blade 110, for example, end cap(s) 130 and pivot bracket(s) 200.

In certain embodiments, notches 119 in lower edge 118 of fairing blade 110 can be configured to receive bar 608 of foot 600. Any number of notches 119 can be disposed along lower edge 118 of fairing blade 110. For example, in certain embodiments, four notches 119 can be disposed along lower edge 118 of blade 110. In certain embodiments, notches 119 are symmetrical about a midline of blade 110. In certain embodiments, notches 119 can be shaped like a key hole, having a curved upper portion and straight sides extending away from each other towards lower edge 118. The wider lower portion can make it easier to couple notch 119 with bar 608 of foot 600. In certain embodiments, bar 608 can snap fit into the upper portion of notch 119. Other shapes and sizes of notches 119 are contemplated and can correspond with a shape and size of bar 608 of foot 600.

Figure 16:
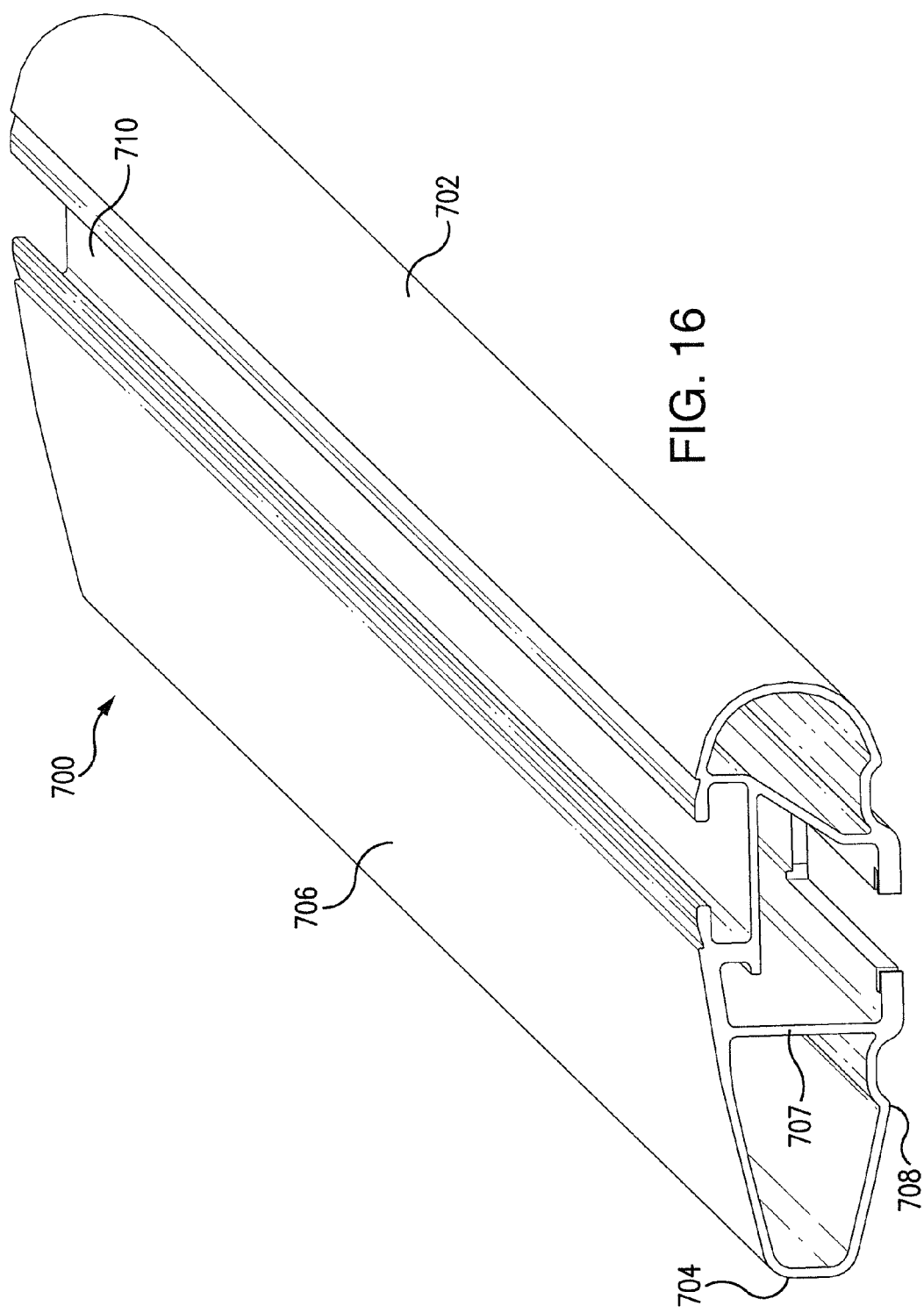
FIG. 16 illustrates a perspective view of a load bar according to an embodiment.

FIG. 16 illustrates load bar 700, according to an embodiment. Load bar 700 can facilitate coupling fairing 100 to roof 800 of a vehicle. In certain embodiments, connection assembly 120 can couple fairing blade 110 to load bar 700. More specifically, in certain embodiments, load bar attachment portion 410 of load bar clip 400 of connection assembly 120 can couple with load bar 700. As discussed herein, in certain embodiments, load bar 700 can include leading edge 702, trailing edge 704, upper surface 706, and lower surface 708. In certain embodiments, leading edge 702 and trailing edge 704 can be aerodynamically designed to reduce wind resistance of load bar 700. In certain embodiments, upper surface 706 can include groove 710. Groove 710 can facilitate attachment of load bar clip 400 to load bar 700 by providing a place to hook into. In certain embodiments, one or more interior brace 707 can increase the strength and rigidity of load bar 700.

Figure 17:
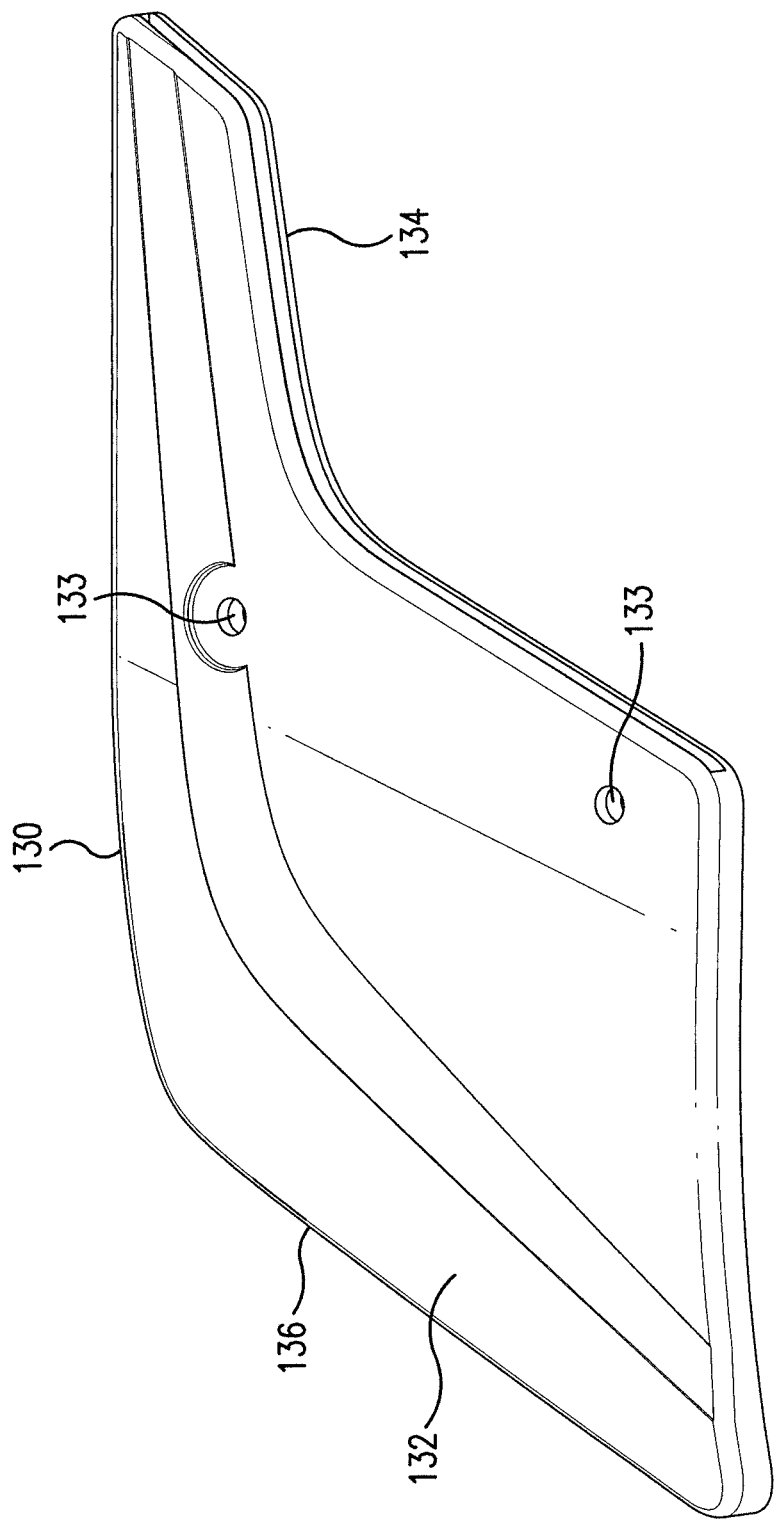
FIG. 17 illustrates a front perspective view of an end cap according to an embodiment.
Figure 18:
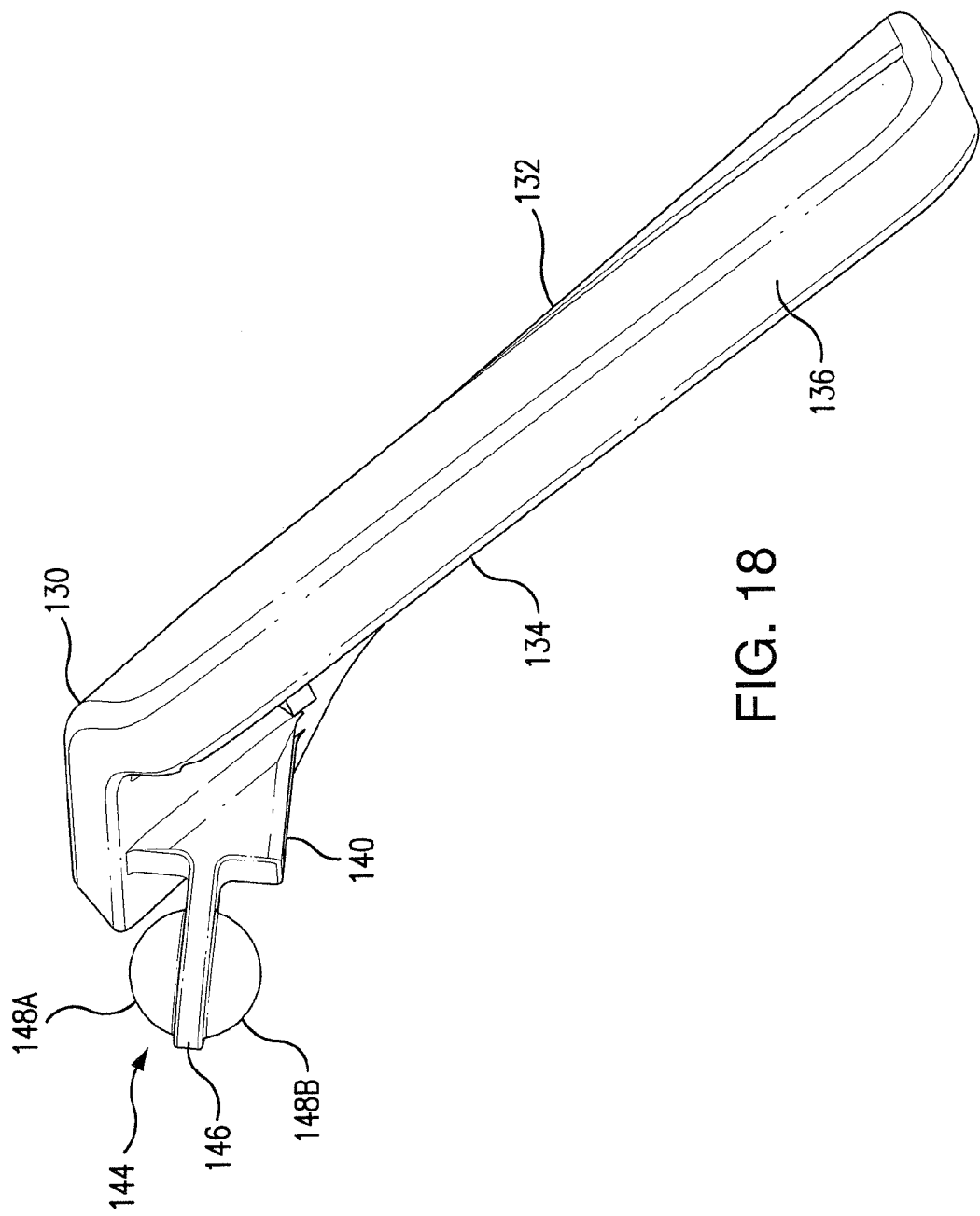
FIG. 18 illustrates a side perspective view of an end cap according to an embodiment.

FIGS. 17 and 18 illustrate end cap 130, according to an embodiment. In certain embodiments, end cap 130 can include front face 132, rear face 134, and outer edge 136. In certain embodiments, holes 133 can extend through front face 132 and rear face 134 so that fasteners 101 can couple end cap 130 with fairing blade 110. In certain embodiments, fairing blade 110 can fit within a slot (not shown) between front face 132 and rear face 134 of end cap 130.

As shown in FIG. 18, in certain embodiments, tail 140 can extend from rear face 134 of end cap 130. Tail 140 of end cap 130 can be similar to tail portion 220 of pivot bracket 200, as described above. Tail 140 of end cap 130 can allow end cap 130 to couple directly with pivot arm 300 of connection assembly 120. Thus, tail 140 of end cap 130 can be part of joint 122 of connection assembly 120. In certain embodiments, tail 140 can include ball 144. In certain embodiments, ball 144 can include ridge 146, which can define a first hemisphere 148A and a second hemisphere 148B of ball 144. Ball 144 can interface with pivot arm 300 in the same manner as described above with respect to tail portion 220 of pivot bracket 200.

It is to be appreciated that the Detailed Description section, and not the Brief Summary and Abstract sections, is intended to be used to interpret the claims. The Summary and Abstract sections may set forth one or more but not all exemplary embodiments of fairings as contemplated by the inventors, and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A fairing for a vehicle load bar, comprising:
   an elongate blade; and
   a connection assembly configured to couple the blade to the load bar, the connection assembly comprising:
   a joint having a ball disposed in a socket, wherein the ball is configured to rotate within the socket,
   a pivot bracket coupled to the blade, the pivot bracket comprising the ball,
   a pivot arm comprising the socket, wherein the ball of the pivot bracket is disposed in the socket, and
   a load bar clip comprising a load bar attachment portion and a pivot arm attachment portion.

2. The fairing of claim 1, wherein the pivot arm comprises a first arm having a first socket and a second arm having a second socket, wherein the second arm is connected to the first arm by an elbow portion.

3. The fairing of claim 2, wherein the first arm, the second arm, and the elbow portion are integrally formed.

4. The fairing of claim 2, wherein the ball comprises a ridge defining a first hemisphere and a second hemisphere, and wherein a portion of the first hemisphere is disposed in the first socket and a portion of the second hemisphere is disposed in the second socket.

5. The fairing of claim 4, wherein the ridge is configured to limit a range of motion of the ball within the first and second sockets.

6. The fairing of claim 1, wherein the pivot bracket comprises a head portion coupled to the blade and a tail portion extending from the head portion, wherein the ball is disposed at an end of the tail portion.

7. The fairing of claim 6, wherein the head portion comprises a first plate and a second plate, and wherein an upper edge of the blade is disposed in a slot between the first plate and the second plate.

8. The fairing of claim 1, wherein the pivot arm attachment portion of the load bar clip comprises:
a first extension;
a second extension generally parallel to the first extension; and
a rod connecting the first extension and the second extension.

9. The fairing of claim 8, wherein when a fastener of the pivot arm is unfastened, an elbow portion of the pivot arm is rotatable about the rod of the pivot arm attachment portion, and wherein when the fastener is fastened, the elbow portion of the pivot arm is fixed about the rod of the pivot arm attachment portion and the ball is free to rotate in the socket.

10. The fairing of claim 1, wherein the load bar attachment portion comprises:
a hook having an interior surface configured to contact a lower surface and trailing edge of a load bar; and
at least one prong configured to engage a groove in an upper surface of the load bar.

11. A fairing for a vehicle load bar, comprising:
a blade; and
a foot disposed at a lower edge of the blade and configured to engage a roof of a vehicle, wherein the foot comprises:
a heel,
a first leg,
a second leg spaced from the first leg, and
a bar connecting the first leg and the second leg,
wherein a lower edge of the blade is configured to couple to the bar to secure the foot to the blade.

12. The fairing of claim 11, wherein the foot further comprises:
a convex lower surface, and
a pad disposed on the convex lower surface,
wherein a notch in the lower edge of the blade is configured to couple to the bar to secure the foot to the blade.

13. A system for attaching a fairing to a load bar, comprising:
a pivot bracket comprising:
a head portion having a first plate and a second plate spaced from the first plate, and
a tail portion comprising a ball;
a pivot arm comprising:
a first arm having a first socket, and
a second arm having a second socket, wherein the second arm is integrally connected to the first arm by an elbow portion,
wherein the ball of the pivot bracket is disposed in the first socket and the second socket and configured to rotate in the first and second sockets; and
a load bar clip, comprising:
a load bar attachment portion, and
a pivot arm attachment portion having a rod,
wherein the elbow portion of the pivot arm is selectively rotatable about the rod.

14. The system of claim 13, wherein the ball comprises a ridge defining a first hemisphere and a second hemisphere, wherein a portion of the first hemisphere is disposed in the first socket and a portion of the second hemisphere is disposed in the second socket, and wherein the ridge is configured to limit a range of motion of the ball with the first and second sockets.

15. The system of claim 13, wherein the load bar attachment portion comprises:
a hook having an interior surface configured to follow a contour of a lower surface and a trailing edge of the load bar; and
at least one prong configured to curve around a leading edge of the load bar and engage a groove in an upper surface of the load bar.

16. The system of claim 13, further comprising a bar adapter disposed within the load bar attachment portion of the load bar clip, wherein the bar adapter includes a cutout sized to surround and contact an exterior surface of the load bar.

17. The system of claim 16, wherein the bar adapter further comprises a latch disposed between the prong and the hook configured to secure the bar adapter about the load bar.

18. A fairing for a vehicle load bar, comprising:
an elongate blade;
an end cap comprising:
a front face and a rear face defining a slot configured to enclose an end of the blade, and
an attachment element extending from the rear face of the end cap, the attachment element comprising a first ball; and
a first pivot arm comprising:
a first arm having a first socket, and
a second arm having a second socket, wherein the second arm is connected to the first arm by a first elbow portion, and
wherein the first ball is disposed in the first socket and the second socket.

19. The fairing of claim 18, further comprising:
a pivot bracket comprising:
a head portion coupled to the blade, and
a tail portion comprising a second ball; and
a second pivot arm comprising:
a third arm having a third socket, and
a fourth arm having a fourth socket, wherein the third arm is connected to the fourth arm by a second elbow portion, and
wherein the second ball is disposed in the third socket and the fourth socket.

20. A fairing for a vehicle load bar, comprising:
an elongate blade; and
a connection assembly configured to couple the blade to the load bar, the connection assembly comprising:
a joint having a ball disposed in a socket, wherein the ball is configured to rotate within the socket, a pivot bracket coupled to the blade,
a pivot arm comprising a first arm having a first socket portion and a second arm having a second socket portion,
wherein the first arm is connected to the second arm by an elbow portion, and
wherein the first arm, the second arm, and the elbow portion are integrally formed.

21. A fairing for a vehicle load bar, comprising:
an elongate blade; and
a connection assembly configured to couple the blade to the load bar, the connection assembly comprising:
a joint having a ball disposed in a socket, wherein the ball is configured to rotate within the socket;
a pivot bracket coupled to the blade;
a pivot arm coupled to the pivot bracket, wherein the joint comprises the pivot bracket and the pivot arm; and
a load bar clip comprising a load bar attachment portion and a pivot arm attachment portion.

22. The fairing of claim 21, wherein the ball is coupled to the pivot bracket and the pivot arm comprises the socket.

\* \* \* \* \*